March 14, 1961 E. R. DAVIES ET AL 2,974,545
MULTIPLE SPEED TRANSMISSION
Filed Dec. 10, 1953 10 Sheets-Sheet 1

INVENTORS:
Edward R. Davies
Glenn L. Bowen
Robert W. Lemon
BY
ATTORNEY.

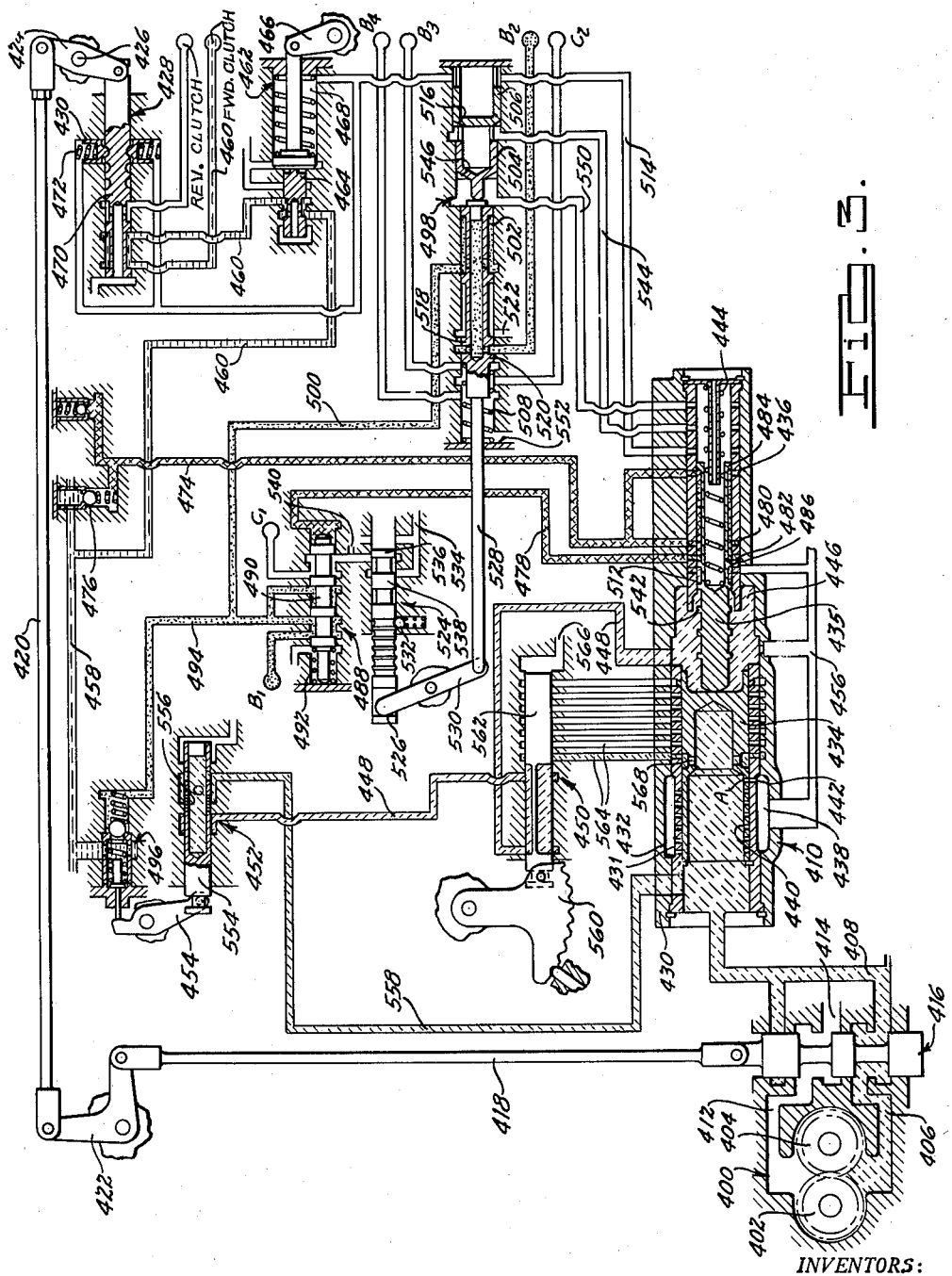

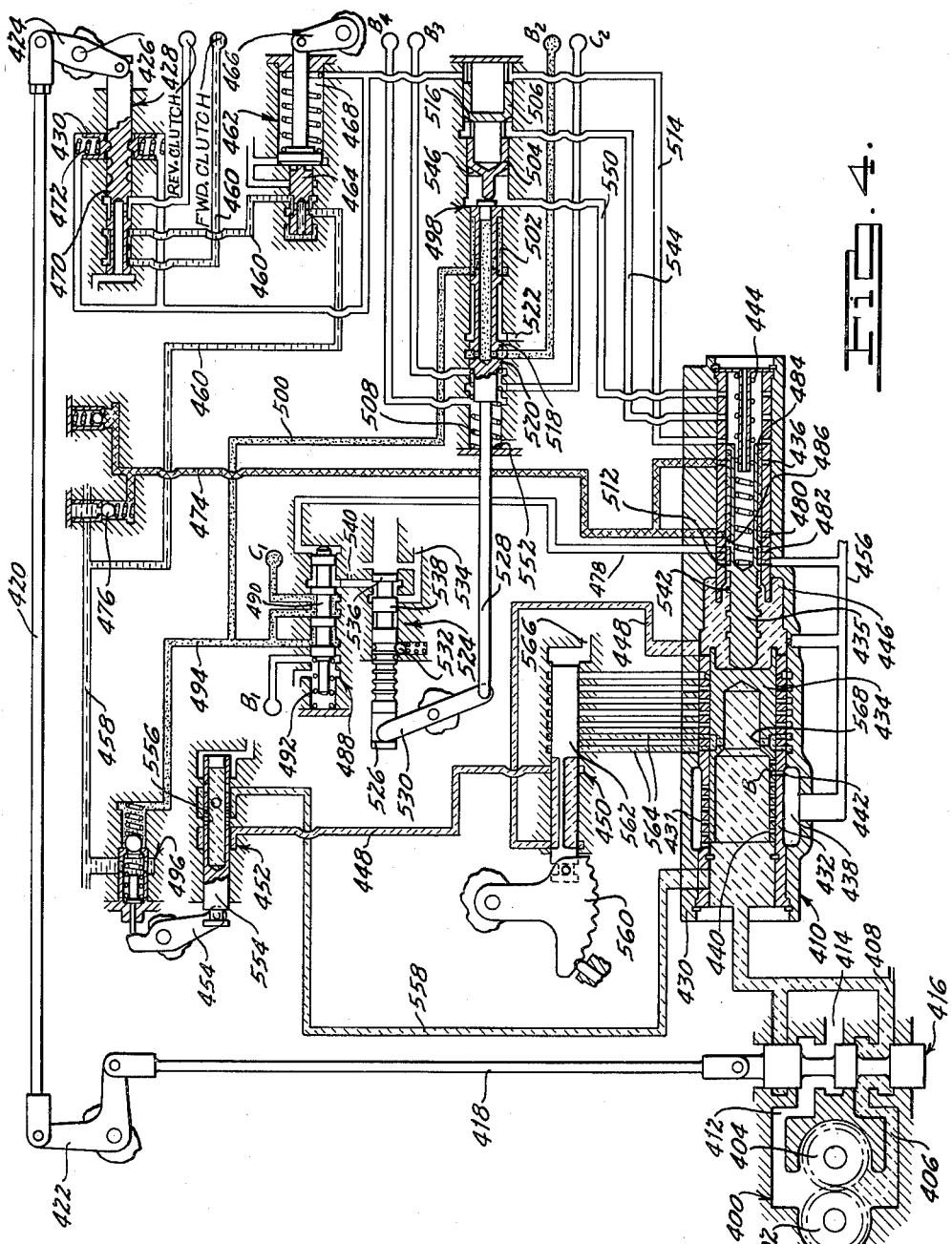

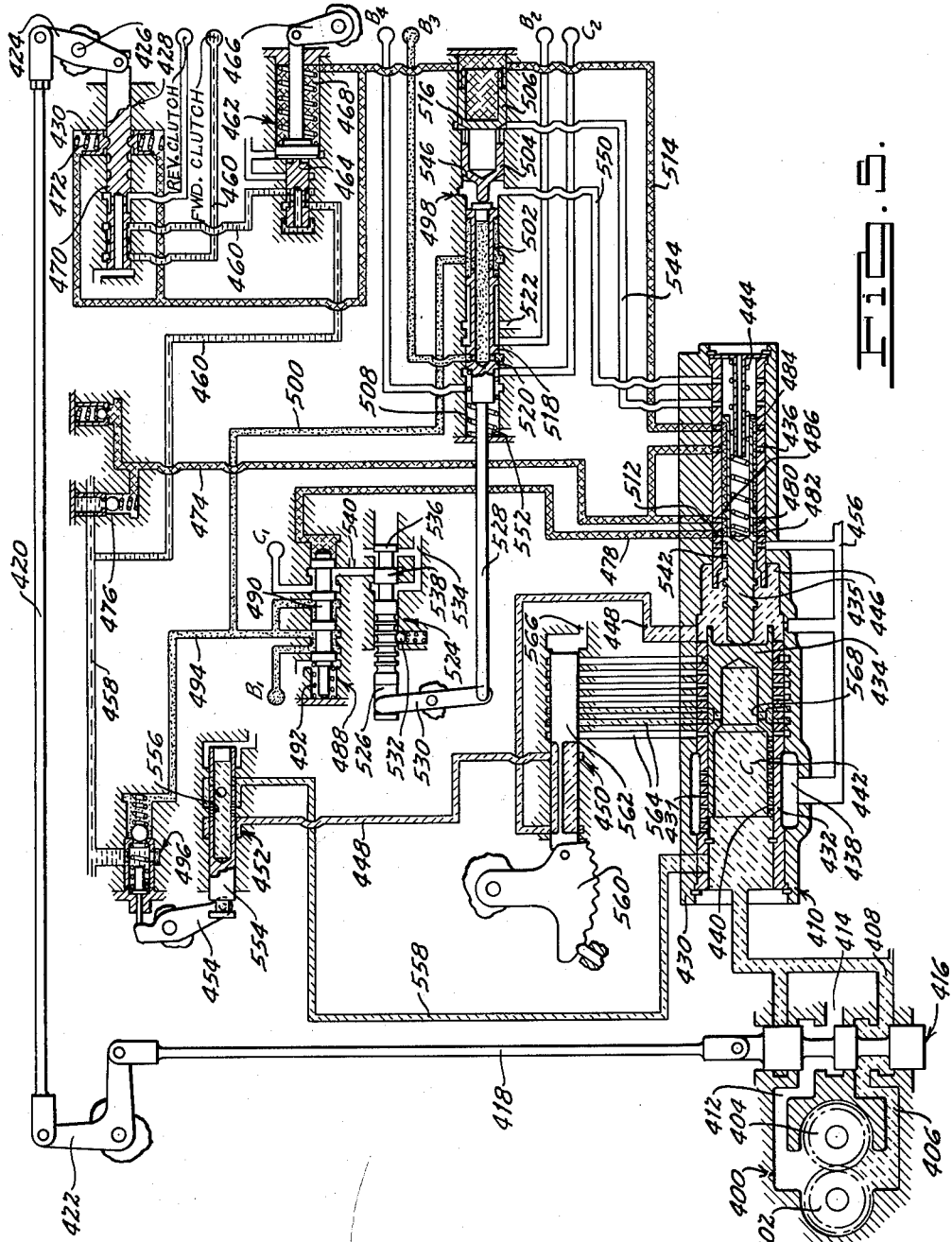

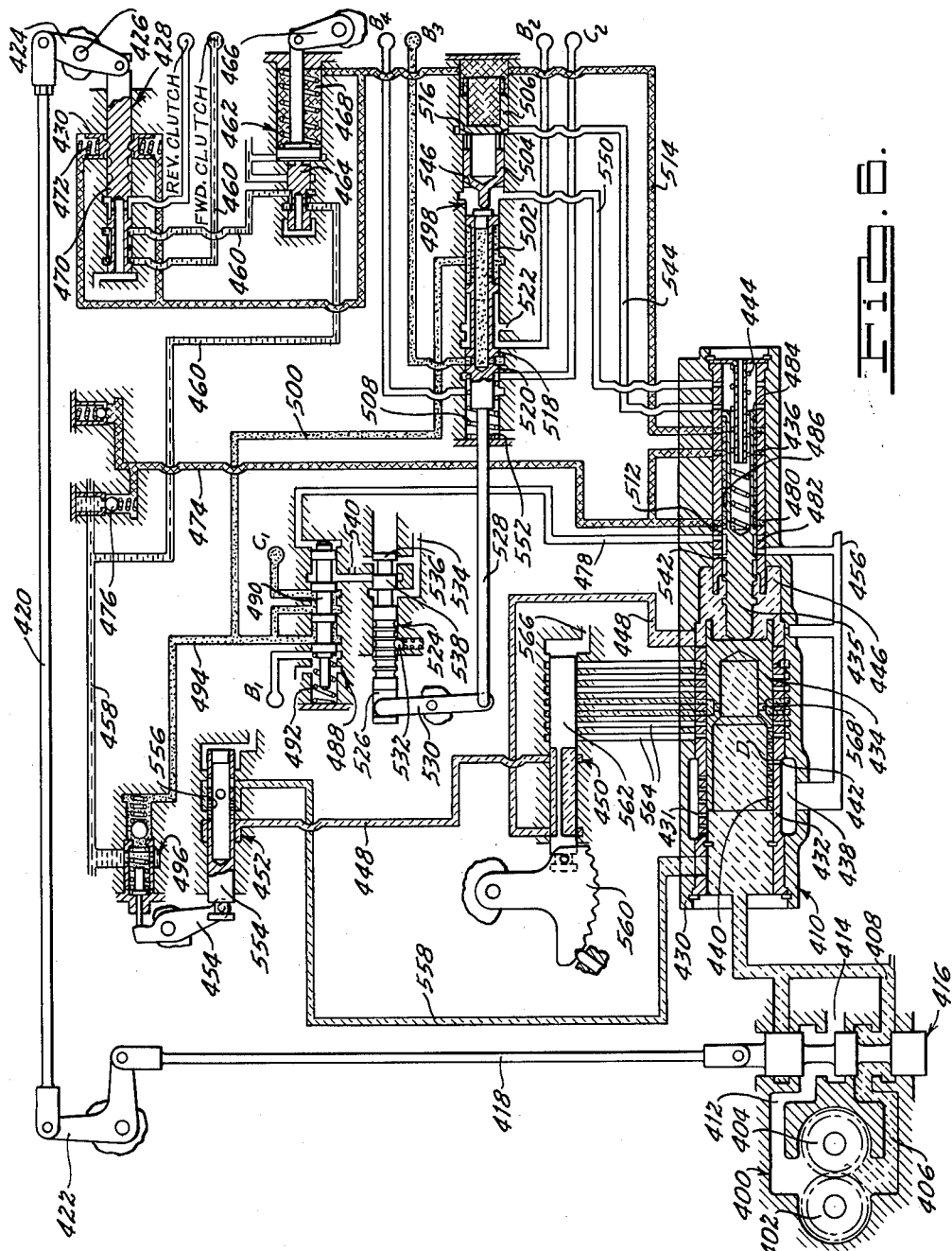

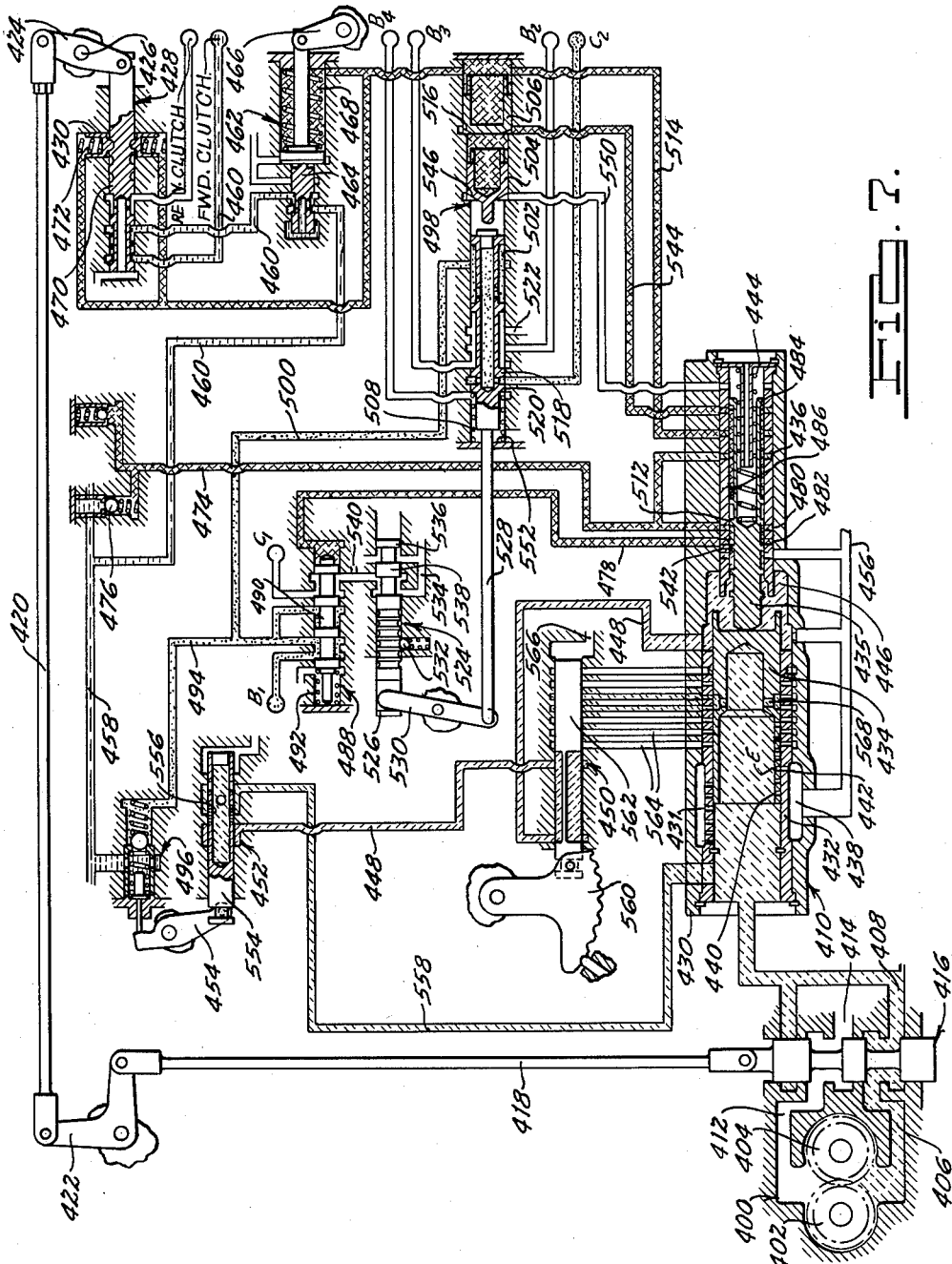

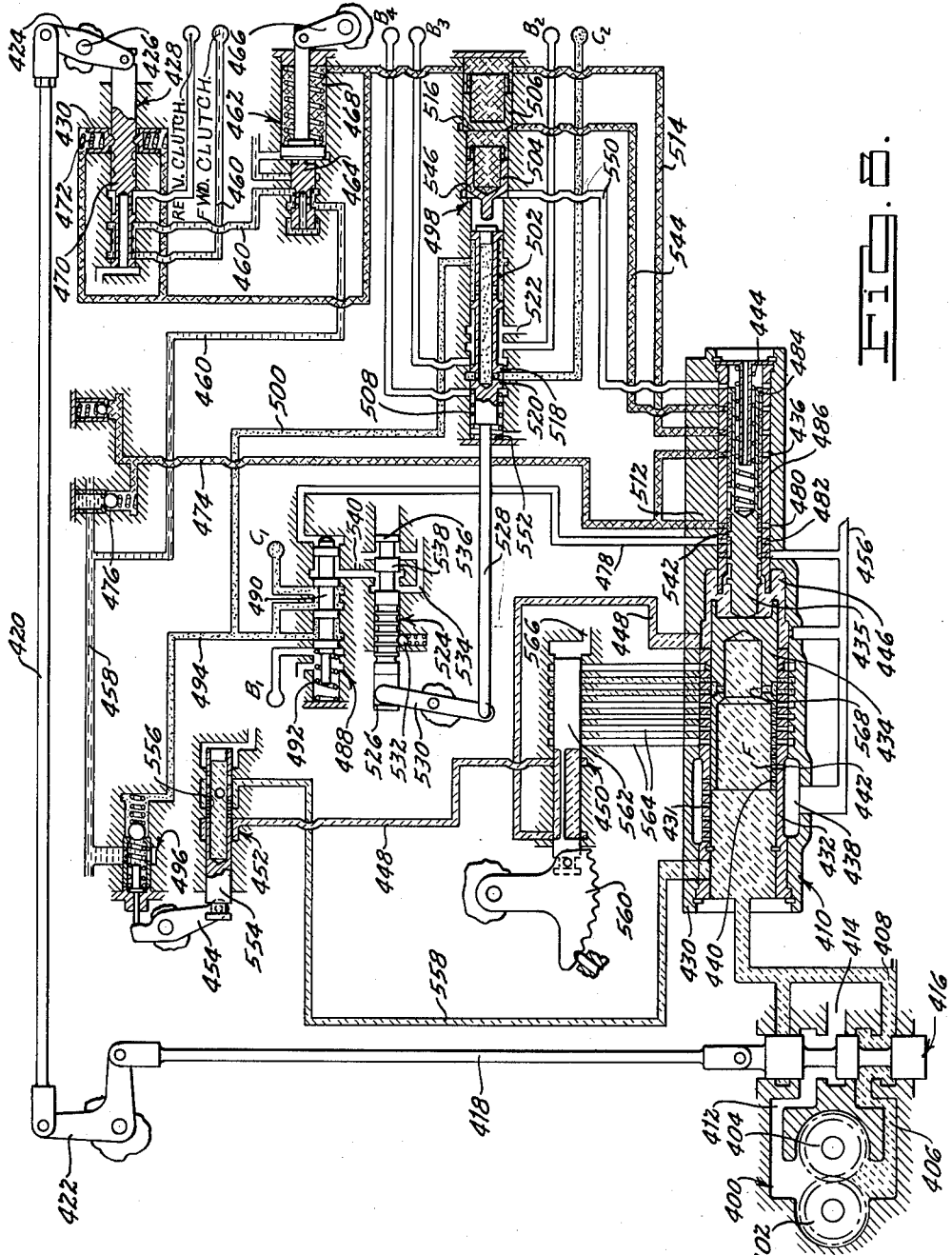

March 14, 1961  E. R. DAVIES ET AL  2,974,545
MULTIPLE SPEED TRANSMISSION
Filed Dec. 10, 1953  10 Sheets-Sheet 9

FIG. 9.

INVENTORS:
Edward R. Davies
Glenn L. Bowen
Robert W. Lemon
BY
ATTORNEY.

INVENTORS:
Edward R. Davies
Glenn L. Bowen
Robert W. Lemon
BY
ATTORNEY.

United States Patent Office 2,974,545
Patented Mar. 14, 1961

2,974,545
MULTIPLE SPEED TRANSMISSION

Edward R. Davies, Oak Park, and Glenn L. Bowen and Robert W. Lemon, Detroit, Mich., assignors to Jered Industries, Inc., Hazel Park, Mich., a corporation of Michigan Filed Dec. 10, 1953, Ser. No. 397,297

30 Claims. (Cl. 74—720.5)

This invention relates to a power transmitting mechanism and more particularly to a variable speed transmission of the planetary type which is especially adapted for use with heavy wheeled or tracked vehicles and power equipment or the like, but which is also capable of other uses.

The provision of a transmission of the type briefly mentioned above being the principal object of the invention, another object of the invention is to provide a power transmission having a power output shaft, a power input shaft and a plurality of planetary gearsets for operatively interconnecting the power output and power input shafts to provide selectively a series of speed reduction ratios.

Another object of the present invention is to provide a power transmission which includes a series of compounded planetary gearsets and clutch and brake means for selectively controlling the individual elements of each planetary set in an operative sequence to obtain a series of reduction ratios which are evenly stepped from the lowest to the highest ratio.

Another object of the present invention is to provide a power transmission having a plurality of planetary gearsets assembled and compounded into a compact arrangement having minimum space requirements.

Another object of the present invention is to provide a power transmission having a power input shaft, a power output shaft, a series of compounded planetary gearsets for operatively interconnecting the input and output shafts, clutch and brake means for selectively controlling the component elements of each planetary set, and a simple planetary gearset operatively interposed between the input shaft and the series of compounded planetary gearsets.

Another object of the present invention is to provide a power transmission mechanism according to the preceding object wherein the simple planetary set is operative to provide alternately two reduction ratios which are selectively combined with the reduction ratios obtained in the series of compounded planetary gearsets.

Another object of the present invention is to provide a power transmitting mechanism according to the preceding object in which the simple planetary gearset is adapted to provide alternately two gear reduction ratios for each of the reduction ratios obtained in the series of compound planetary gearsets thereby providing a number of overall reduction steps which is equal to twice the number of steps obtainable in the series of compound planetary sets when used alone.

Another object of the present invention is to provide a power transmitting mechanism for delivering power from a power input shaft to a perpendicular power output shaft which includes a series of compounded planetary gearsets and an independent planetary gear unit, the power output element of the independent gear unit being connected operatively and drivingly to the compounded planetary sets by suitable gear means, the elements of the compounded gearsets being selectively controlled by clutch and brake means, and the elements of the independent planetary unit being controlled selectively and alternately to provide a plurality of overall reduction ratios for each reduction ratio of the compounded planetary elements.

Another object of the invention is to provide a new and improved multiple speed transmission having a plurality of evenly stepped overall reduction ratios in a forward direction and also a full range of reverse speeds.

Another object of the invention is to provide a transmission having a new and improved arrangement of planetary gear elements.

Another object of the invention is to provide a drive transmitting mechanism having new and improved subassemblies of planetary gear trains.

Other objects and advantages of the invention will become apparent from the following description and the accompanying drawings wherein:

Figures 2b and 2c are a plot of the engine characteristics for a typical engine used to obtain the curves of Figure 2a;

Figures 3 through 10 are valving diagrams for one suitable automatic control means for the transmission of the present invention, each view showing the operative positions of the valves for separate transmission speeds.

Figure 1:
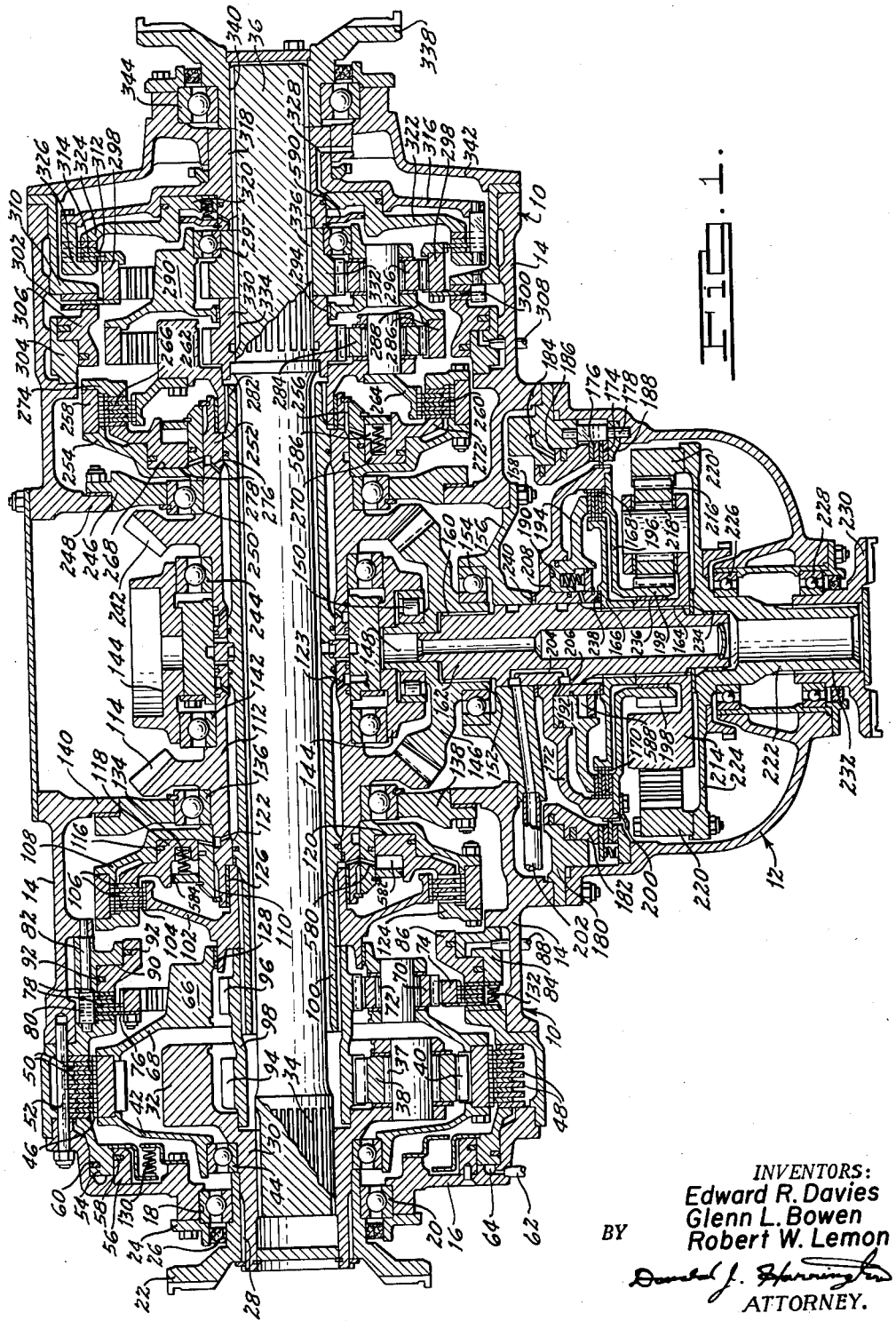
Figure 1 is an assembly view of the multiple speed transmission.

In setting forth the principles of the invention, reference will be made to one particular embodiment herein disclosed in which four interdependent planetary gearsets are concentrically disposed about an output shaft. These gearsets are grouped into two pairs spaced axially along the output shaft, each set comprising a ring gear, a set of planet gears with a carrier, and a sun gear. The two sun gears for each pair of gearsets are integrally assembled upon common shafts which are concentrically disposed with respect to each other, the sun gears of one pair being clutched to a power input source, and the sun gears of the other pair being splined to the output shaft.

Suitable brake means are provided for selectively braking the ring gears of the one pair of gearsets, and the carrier of the first of this pair of gearsets is operatively connected to the ring gear of the second of the pair. The carrier for this second of the one pair of gearsets is splined to the output shaft.

The sun gears for the one pair of gearsets are operatively connected to the carrier of a first of the other pair of gearsets by means of a hollow, axially extending shaft concentrically disposed about the output shaft. The ring gear for this first of the other pair of gearsets is operatively connected to the carrier for the second of the other pair. Means are provided for selectively braking the ring gear for this second gearset and for clutching the same to the output shaft.

The power input source for the above-described four interdependent planetary gearsets includes an input shaft disposed perpendicularly to the output shaft, said input and output shafts being drivably connected by a suitable bevel gear drive. This input shaft is splined to the carrier assembly of a simple planetary gear unit which will hereinafter be referred to as the "split ratio unit." The ring gear of the "split ratio unit" is adapted to receive power from any suitable power source. Means are provided for selectively and alternately clutching the sun gear of the "split ratio unit" to the carrier and input shaft and for braking the sun gear to the transmission casing.

Suitable control means may be provided for progressively clutching and braking the component elements of the four interdependent and compounded planetary gearsets and for alternately clutching and braking the sun gear of the "split ratio unit" as previously pointed out. For purposes of the present disclosure the term "compounded" planetary gear unit or gearset will be used to describe a gear unit which cooperates with another gear unit in such a way that the two units produce a combined gear ratio. When so used, the term "compounded" gear unit may be used to describe cooperating gear units capable of producing a torque split or capable of combining torque from separate paths and distributing the same to a unitary torque delivery path.

The clutches or brakes for the four compounded planetary gearsets may be individually energized in an operative sequence, and as each clutch or brake is so energized, an additional speed ratio may be obtained merely by alternately clutching and braking the sun gear of the "split ratio unit." Thus, the "split ratio unit" is effective to double the number of speeds which might ordinarily be obtained from the four compounded planetary gearsets alone.

For the purpose of more particularly describing the presently disclosed embodiment, reference will first be made to the assembly view of Figure 1 wherein the numeral 10 is used to generally designate the transmission proper, and the numeral 12 is used to designate the "split ratio unit." The transmission housing casting is shown at 14 and is substantially cylindrical in shape. An end plate 16 is suitably secured to one end of the housing 14 as shown. The plate 16 is provided with a suitable aperture 18 adapted to receive a bearing 20 which rotatably secures a power output flange 22. A suitable bearing retainer and a seal are provided at 24 and 26 respectively.

The flange 22 is splined at 28 to a hub extension 30 of a planet carrier 32. The hub extension 30 is in turn splined at 34 to a power output shaft 36 which extends axially thrrough the housing 14. The carrier 32 rotatably carries upon needle bearings 37 a plurality of planet gears 38 which are engaged with ring gear 40.

The ring gear 40 is supported and positioned by members 42 which extend radially inward from ring gear 40 and which are rotatably journalled by bearing 44. The bearing 44 is seated upon the hub extension 30.

The outer periphery of the ring gear 40 is provided with splines at 46 which receive a plurality of internally splined brake discs 48. Stationary discs 50 are alternately interposed between the discs 48, as shown in Figure 1, and are fixed to the housing 14 by means of an anchor member or key 52.

An annular piston member is shown in Figure 1 at 54 and is adapted to move axially within an annular cylinder defined by the plate 16 and ring member 56, the latter being secured to the plate 16 concentrically with respect to shaft 36 and ring gear 40. Suitable piston rings 58 and 60 may be provided on the ring member 56 and piston 54 respectively.

The piston member 54 is actuated by hydraulic fluid which enters a suitable port 62 and then progresses throughout a circular recess 64 in cover 16. The hydraulic fluid is thereby caused to act against the piston 54 and move the same axially thereby causing the discs 48 and 50 to be compressed between housing 14 and the piston 54.

The ring gear 40 is integrally joined to the carrier 66 of a second planetary set by means of extension 68. The carrier 66 rotatably mounts a plurality of planet gears 70 by means of needle bearings 72. The planet gears 70 engage a ring gear 74 which is externally splined at 76 and which carries brake discs 78 about the periphery thereof.

Mating brake discs 80 are alternately disposed with respect to the discs 78 and are retained in a fixed position by an anchor member 82.

The anchor member 82 also retains a circular servo cylinder member 84 in a fixed position, as shown in Figure 1. A corresponding circular piston member 86 is slidably received within the cylinder member 84 and is adapted to move axially against the discs 78 and 80 when hydraulic fluid is supplied under pressure to the port 88 thereby compressing the discs 78 and 80 against the housing 14. The hydraulic actuating fluid entering port 88 is allowed to become distributed over the lateral working face 90 of piston member 86. Piston rings 92 are provided as shown for sealing purposes.

The sun gears for the planet sets previously described are shown at 94 and 96, respectively, and are formed integrally upon a common sleeve 98 which is splined to a sleeve 100 concentrically disposed about the power output shaft 36.

A clutch member 102 is also splined to the sleeve 100 and it extends radially to a set of clutch plates 104 which are internally splined upon the periphery of the member 102. The clutch plates 104 are alternately disposed with respect to plates 106 which are carried by clutch member 108 which in turn is splined at 110 to a hub extension 112 of bevel gear 114.

The clutch member 108 is provided with an annular recess 116 within which a servo piston member 118 is slidably received. Hydraulic actuating fluid is admitted to the working surface 120 of piston 118 through a port 122 thereby causing the plates 104 and 106 to be compressed against the abutment portion 124 of the clutch member 108. The actuating fluid is transmitted to the port 122 through the annular space surrounding sleeve 100 and the fluid passage 123 which is adapted to receive an external fluid connection extending from a control valve body subsequently to be described. Sleeve bearings are provided at 126 and 128 to provide needed support for the clutch member 102 and carrier 66 respectively.

The brake 48, 50, the brake 78, 80 and the clutch 104, 106 are each provided with a spring return means at 130, 132 and 134, respectively, for disengaging the associated clutch or brake when the hydraulic actuating pressure is released.

The bevel gear 114 and the associated hub extension 112 are rotatably journalled about shaft 36 by means of bearing 136 which is retained within an adaptor plate 138 secured to the inwardly extending flange 140 of housing 14. The bevel gear 114 is also rotatably mounted by means of bearing 142 within a fixed yoke extension 144 of the housing 14. Suitable rib members, not shown, may be used to support the structure 144 and secure the same to the housing 14.

Another bevel gear 146 is drivably engaged with the gear 114 and is provided with a hub 148 which is rotatably mounted within the yoke structure 144 by means of a suitable bearing 150. The gear 146 has another hub extension 152 which is rotatably journalled in bearing 154 secured and retained within a mounting plate 156 which in turn is bolted to the casing 14 at 158.

The hub extension 152 is internally splined at 160 to receive the shaft 162 of the "split ratio unit" 12. The shaft 162 is splined at 164 to a clutch member 166 which extends radially from the shaft 162 to which it is integrally splined. The outer periphery of the radially extending member 166 is splined to receive internally splined clutch plates 168. A mating set of clutch plates 170 are alternately disposed in mating relationship with respect to plates 168 and are drivably carried by the clutch and brake member 172 which is rotatably mounted about shaft 162 and which also carries brake disc 174 about the outer periphery thereof.

The disc 174 is disposed adjacent the discs 176 which are held in a fixed position by anchor member 178 which is retained in the outer casing for the "split ratio unit" 12. An annular ring 180 is secured to the housing 14 and serves as a servo cylinder for the brake assembly 174, 176. A circular piston member 182 is received within ring 180 and is adapted to be moved in the direction of the axis of shaft 162 by means of hydraulic fluid which is permitted to enter port 184. The working surface 186 of the piston member 182 is in communication with the port 184. Upon movement of the piston 182, the discs 174 and 176 are compressed against the abutment member 188 secured to the outer casing of the "split ratio unit."

The clutch and brake member 172 is provided with an annular recess 190 within which a circular piston 192 is slidably retained. The piston 192 has a radial portion 194 which acts against the clutch plates 168 and 170 to compress the same against an extension 196 of the hub of sun gear 198. Extension 196 and the clutch and brake member 172 are integrally joined at 200 thereby forming one integral unit.

The piston member 192 is actuated by hydraulic fluid which enters conduit 202 and which then is allowed to pass through conduit 204 and port 206 into the working chamber behind the working face 208 of piston 192. A suitable return spring means is provided as shown for returning the piston 192 to the inoperative position when the hydraulic actuating pressure is reduced. A similar return spring means may also be provided to similarly return the piston 182 to the inoperative position.

A carrier member for the "split ratio unit" 12 is shown at 214 and is integrally splined to the shaft 162 at 164 along with the member 166 forming an integral assembly with the same. Planet gears 216 are rotatably mounted on carrier member 214 upon needle bearings 218 and they mesh with the sun gear 198 and the associated ring gear 220. The ring gear is drivably secured to a power input shaft 222 by means of a radially extending flange 224 on the shaft 222.

The shaft 222 is rotatably journalled in the outer housing for the "split ratio unit" 12 by means of suitable bearings 226 and 228. A power input flange 230 is integrally splined to shaft 222, as shown at 232.

Suitable bushings may be provided as needed for support at 234, 236, 238, and 240.

Referring again to the yoke structure 144 of Figure 1, it is seen that a second bevel gear 242 is mounted therein in juxtaposed relationship with respect to bevel gear 114. A suitable bearing is provided at 244 for this purpose between the hub of gear 242 and the structure 144.

An adaptor plate 246, which corresponds to the previously described plate 138, is bolted to an inwardly extending flange 248 of the housing 14 and serves as a mounting member for bearing 250 which is seated upon a hub extension 252 for the gear 242 and which supports the same.

A clutch member 254 is splined at 256 to the hub extension 252 and it comprises a radially extending portion which carries an internally splined adaptor 258 at the radial extremity thereof. A series of externally splined clutch plates 260 are received within the adaptor 258.

A carrier member 262 for another planetary gearset is shown in Figure 1 and it carries a clutch member 264 which is integrally secured thereto. The periphery of the clutch member is externally splined to carry the internally splined clutch plates 266 which are alternately disposed in adjacent relationship with respect to plates 260.

The member 254 is formed with an annular recess 268 which receives an annular piston member 270. The piston member 270 is formed with a radial portion 272 which is adapted to engage the clutch plate assembly 260, 266 and compress the same against a shoulder 274 secured to the member 254 and adaptor 258. Axial movement of the piston 270 takes place as hydraulic fluid is admitted under pressure through port 276 into the working space behind the piston face 278. A suitable return spring means provided as shown, is operative to return the piston 270 to an inoperative position when the hydraulic working fluid is exhausted from annular recess 268.

The carrier member 262 is integrally splined to the sleeve 100 at 282 and it carries planet gears 284 which engage an associated ring gear 286.

The ring gear 286 is supported by an extension 288 on the planet carrier member 290 which is in turn rotatably mounted by means of bearing 297 and bushing 294.

The carrier 290 rotatably carries a plurality of planet gears 296 which engage their associated ring gear 298. The ring gear 298 is provided with a radially extending brake disc 300 which is interposed between friction discs 302. An annular ring, which defines in part a servo cylinder, is provided at 304 and is integrally secured to housing 14. A circular piston member 306 is slidably received within the ring 304 and is adapted to move axially as hydraulic fluid is admitted under pressure through port 308 thereby compressing the disc 300 and 302 against a shoulder 310 secured to the housing 14.

The ring gear 298 is also provided with a radially extending clutch plate 312 in the side opposite to that which carries disc 300. The plate 312 is disposed between plates 314 which are drivably carried by the reaction member 316 which in turn is splined at 318 to the shaft 36.

The reaction member 316 is provided with an annular recess 320 which receives piston member 322 having a radial portion 324 which is adapted to engage the clutch plates 312 and 314 and compress the same against the shoulder 326 formed on the reaction member 316. Actuating fluid may be admitted to the working space behind the piston 322 through port 328 to move the piston axially against the clutch plates 312 and 314.

The sun gears for the pair of compounded planet sets just described are shown at 330 and 332 respectively. Each of these sun gears is integrally splined to the shaft 36 at 334 and 336, respectively.

A second power output flange 338 is splined to the shaft 36 at 340 and is rotatably supported within a closure plate 342 by means of a suitable bearing 344. Closure plate 342, which corresponds to plate 16 at the opposite end of the shaft 36, is integrally secured to the housing 14.

In describing the operation of the present invention and the sequence required in energizing the various clutches and brakes to selectively obtain steps of progressively increasing speed ratios, the following nomenclature will be used for purposes of clarity.

Brake assembly 174, 176=brake 1
Brake assembly 48, 50=brake 2
Brake assembly 78, 80=brake 3
Brake assembly 300, 302=brake 4
Clutch assembly 168, 170=clutch 1
Clutch assembly 312, 314=clutch 2
Clutch assembly 260, 266=forward clutch
Clutch assembly 104, 106=reverse clutch

*First speed forward operation—engage—forward clutch, brake 1 and brake 2*

Power is delivered to the input flange 230 which drives the shaft 222 and ring gear 220. The sun gear is held against rotation, the torque reaction being taken by brake 1, and the planet carrier 214 drives shaft 162 and gear 146 at a reduced speed. The power is delivered to gear 242 which transfers it to carrier 262 through the forward clutch. Carrier 262 drives sleeve 100 which drives sun gear 94. The ring gear 40 associated with sun gear 94 is held stationary by brake 2 and the carrier 32 is thereby driven at a further reduced speed which in turn drives the shaft 36 and the output flanges 22 and 338.

*Second speed forward operation—engage—forward clutch, clutch 1 and brake 2*

The power is again delivered to shaft 222 through flange 230. The clutch 1 is effective to lock the sun gear 198 to the shaft 162. Thus both the carrier 214 and the sun gear 198 are locked to the same member, namely, shaft 162. Therefore when the shaft 222 drives the ring gear 220, the entire planetary assembly will turn as a unit at a 1 to 1 ratio. The power flow path from the shaft 162 to the output flanges 22 and 338 will be the same as that previously described for first speed operation.

*Third speed forward operation—engage—forward clutch, brake 1 and brake 2*

The power delivered to input shaft 222 and flange 230 is again delivered to shaft 162 at a reduced speed ratio since the sun gear 198 is now braked against the casing and the carrier 214 is directly connected to shaft 162. Shaft 162 drives bevel gear 146 which drives bevel gear 242. Power is delivered from gear 242 to sleeve 100 through the forward clutch and carrier 262. The sleeve 100 is effective to drive both sun gears 94 and 96. Since the ring gear 74 is held by brake 3, the planet carrier drives the ring gear 40 in the same direction as the direction of rotation of sun gear 94 but at a lesser speed. There is, therefore, a split path for the flow of power from the sleeve 100 to the output carrier through the compounded planetary sets. The carrier 32 is integrally splined to the output shaft 36 and output flange 22.

*Fourth speed forward operation—engage—forward clutch, clutch 1 and brake 2*

It is seen that in order to shift from third to fourth speed, it is not necessary to change the power flow path through the compounded planet sets. The only change required is to cause brake 1 to become disengaged and clutch 1 to become engaged. This creates a 1 to 1 ratio between the speed of shaft 222 and shaft 162 which, when combined with the speed ratio already existing in the compound planet sets, will result in a higher overall speed ratio.

*Fifth speed forward operation—engage—forward clutch, brake 1 and clutch 2*

The power input to flange 230 is again operative to drive shaft 222 and ring gear 220 which, by virtue of the fact that the sun gear 198 is braked to the casing, causes the carrier 214 and shaft 162 to turn at a reduced speed ratio. The shaft 162 is again effective to drive gear 146 which powers gear 242. Power is again delivered to the carrier 262 through the forward clutch. Clutch 2, in effect, locks the ring gear 298 to shaft 36. Since both sun gears 330 and 332 of the second set of compounded planet gears now being considered are also locked or splined to shaft 36, the entire compound planetary assembly turns as a unit at a reduction ratio of 1 to 1. Thus the overall speed ratio under this condition is equal to the speed ratio of the planetary set in the "split ratio unit" times the ratio produced by the bevel gears 146 and 242.

*Sixth speed forward operation—engage—forward clutch, clutch 1 and clutch 2*

To obtain sixth speed, the compounded planetary ratios remain unchanged and the sun gear 198 and carrier 214 in the "split ratio unit" are again locked together by clutch 1 thereby producing a 1 to 1 ratio between input shaft 222 and shaft 162. This 1 to 1 ratio in the "split ratio unit," when combined with the similar ratio in the compounded planetary sets, results in an overall speed ratio, that is equal to the ratio produced by bevel gears 146 and 242 which, in this particular embodiment, is 1.182 to 1.

*Seventh speed forward operation—engage—forward clutch, brake 1 and brake 4*

The power delivered to gear 146 by the "split ratio unit" is transferred to bevel gear 242 and then to carrier 262 through the forward clutch. Since the sun gear 330 is splined to the output shaft 36, the ring gear 286 tends to overspeed and drive carrier 290 at the same rate of speed. Since the ring gear 298 is held, the net result will be an overspeeding of the sun gear 332 and hence the output shaft 36.

*Eighth speed forward operation—enage—forward clutch, clutch 1 and brake 4*

To obtain eighth speed it is only necessary to release brake 1 and engage clutch 1 in the "split ratio unit" thereby obtaining a 1 to 1 ratio in the "split ratio unit" which, when combined with the overspeeding ratio of the compounded planetary sets, results in the highest overall speed ratio.

To obtain reverse operation, the same sequence of steps may be followed except that the reverse clutch will be engaged at all times while the forward clutch is released. Thus it is possible to obtain the same ratios over the entire speed range for reverse as well as for forward operation.

By way of summarizing the above-described sequence of operation, the following tables are provided together with a tabulation of typical torque multiplication ratios which may be obtained with the present embodiment of the invention. These figures are intended to be illustrative of the overall reduction ratios which are obtainable and are not of a limiting nature.

FORWARD OPERATION

| Speed | Energize | Ratio |
|---|---|---|
| 1st | Fwd. Clutch, $B_1$, $B_2$ | 6.045:1 |
| 2nd | Fwd. Clutch, $C_1$, $B_2$ | 4.390:1 |
| 3rd | Fwd. Clutch, $B_1$, $B_3$ | 3.229:1 |
| 4th | Fwd. Clutch, $C_1$, $B_3$ | 2.345:1 |
| 5th | Fwd. Clutch, $B_1$, $C_2$ | 1.628:1 |
| 6th | Fwd. Clutch, $C_1$, $C_2$ | 1.182:1 |
| 7th | Fwd. Clutch, $B_1$, $B_4$ | .877:1 |
| 8th | Fwd. Clutch, $C_1$, $B_4$ | .637:1 |

REVERSE OPERATION

| Speed | Energize | Ratio |
|---|---|---|
| 1st | Rev. Clutch, $B_1$, $B_2$ | −6.045:1 |
| 2nd | Rev. Clutch, $C_1$, $B_2$ | −4.390:1 |
| 3rd | Rev. Clutch, $B_1$, $B_3$ | −3.229:1 |
| 4th | Rev. Clutch, $C_1$, $B_3$ | −2.345:1 |
| 5th | Rev. Clutch, $B_1$, $C_2$ | −1.628:1 |
| 6th | Rev. Clutch, $C_1$, $C_2$ | −1.182:1 |
| 7th | Rev. Clutch, $B_1$, $B_4$ | −.877:1 |
| 8th | Rev. Clutch, $C_1$, $B_4$ | −.637:1 |

Figure 2A:
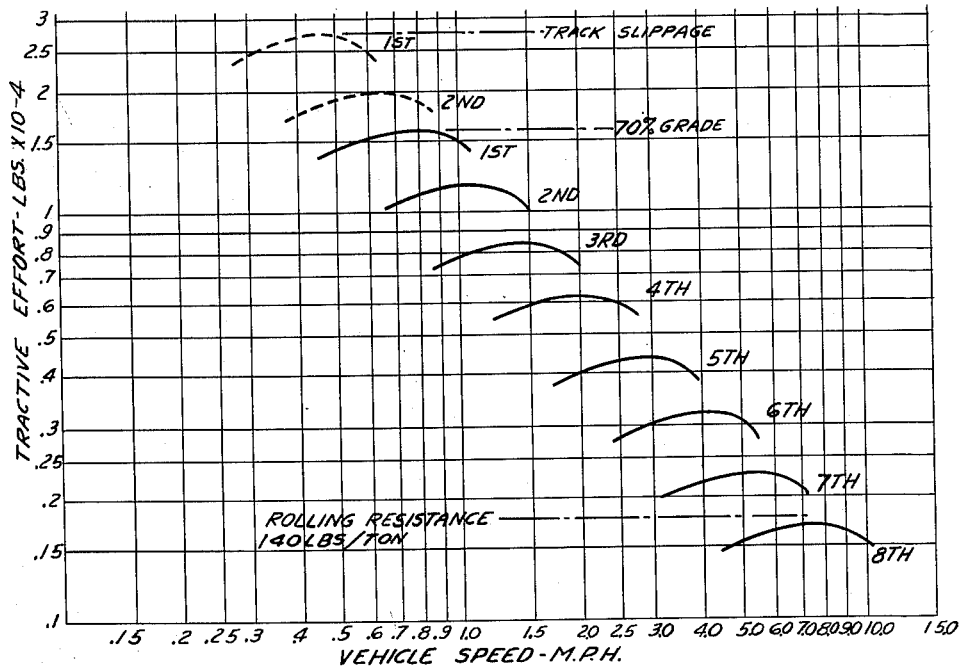
Figure 2a is a plot of the performance characteristics for a typical embodiment of the present invention.
Figure 2B:
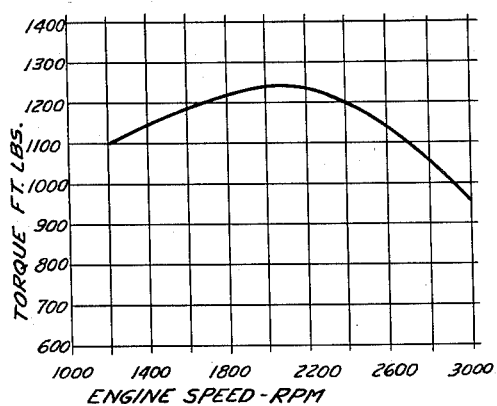
Figure 2C:
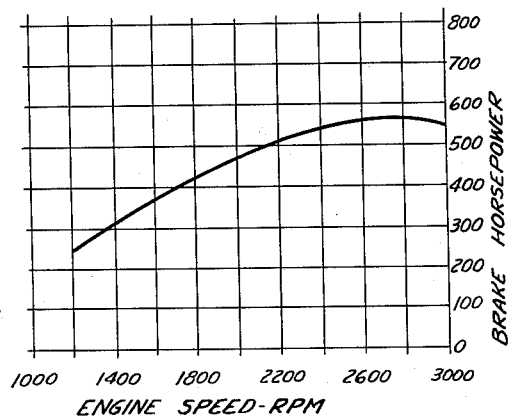

For the purpose of graphically illustrating the performance characteristics for the present embodiment of the invention, the charts of Figure 2a are provided. These performance curves were computed for a typical tracked vehicle weighing approximately 12.5 tons per track and having an air-cooled engine with a speed-torque characteristic and a speed-B.H.P. characteristic as shown in Figures 2b and 2c respectively. It has been assumed that the present transmission has been installed in a tracked vehicle installation which also includes a first reduction gear unit having a constant speed ratio of 6.05 to 1 and a second two-speed reduction unit or final drive having a low speed ratio of 2.95 to 1 at each output flange to further increase the output torque and to transfer the same to the vehicle sprocket wheel which are normally disposed below the centerline of the output shaft. The pitch diameter of the sprocket wheels was assumed to be 33.335 inches. The dotted line curves in Fig. 2a represent the performance when the final drive is in the lowest ratio.

The rolling resistance was assumed to be 140 lbs. per ton and this value is represented by a horizontal line in Fig. 2a.

Figure 2D:
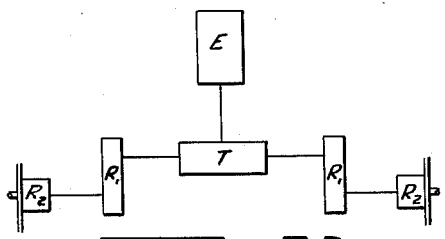
Figure 2d is a schematic representation of the components for a typical vehicle installation incorporating the transmission of the subject invention together with auxiliary reduction units.

A schematic diagram showing the relative position of the various components of the typical arrangement above described is illustrated schematically in Figure 2d. The vehicle engine is shown by means of the symbol "E." The output of the engine is delivered to the multiple speed transmission of the present invention shown at "T."

The output flanges of the transmission "T" extend transversely to either side of the vehicle to the above-mentioned first reduction gear unit shown at $R_1$. The output of the reduction unit $R_1$ is transferred to the two-speed final drive unit designated by the symbol "$R_2$," which has a low speed reduction ratio of 2.95 to 1 as above mentioned. The output of the two-speed final drive "$R_2$" is connected to the sprocket wheel for the vehicle.

Identical reduction units are provided at each side of the transmission "T." The two-speed final drives "$R_2$" enable the operator of the tracked vehicle to accomplish turning maneuvers.

An automatic control valve arrangement suitable for use in controlling and sequentially energizing the clutch and brake servos of the present transmission is illustrated schematically in Figures 3 through 10. This arrangement will be described for the purpose of providing a more complete understanding of the operation of the transmission. It is representative of one of several types of automatic shift control mechanisms which may be employed.

Referring first to Figure 3, a gear pump type governor is shown at 400 having a driving gear 402 and an idler gear 404. The gear 402 may be driven by drivably connecting the same to a suitable driving gear powered by the output shaft 36 thereby causing the pump speed to be directly proportional in magnitude to the speed of the power output flanges of the transmission.

A high pressure discharge conduit 406 extends from the discharge side of gear pump 402, 404 and communicates with conduit 408 which extends to one end of a governor valve 410. A low pressure intake conduit 412 communicates with an exhaust port shown at 414.

A governor control valve is shown at 416 and it is effective to alternately connect the conduit 406 to either the exhaust port 414 or the conduit 408 while simultaneously alternately connecting the conduit 412 to either the conduit 408 or the port 414, respectively, depending upon the axial position which is assumed by the valve 416.

The valve 416 is actuated by a rod 418 which is linked to another rod 420 by a suitable bell crank 422. Rod 420 is operatively connected to a crank 424, which is centrally pivoted at 426 and joined to a selector valve 428. A spring loaded detent 430 is effective to maintain the valve 428 in either of three axial positions depending upon whether the transmission is to be shifted into forward drive, reverse drive or into neutral.

A suitable means may be provided for manually shifting the rods 418 and 420 to selectively obtain forward and reverse speeds. In the positions shown in Figure 3 the valves are adapted for forward speed operation.

It is apparent that the rotation of the gear pump 402, 404 will be reversed when the transmission is operated in reverse rather than in forward speed. The valve 416 will, however, prevent the high pressure fluid from being exhausted out of the port 414 since it is shifted in an axail direction upon movement of the valve 428 and rods 418 and 420 to connect the opposite sides of the pump to the line 408 and to exhaust port 114, respectively.

The governor valve 410 comprises a hollow cylindrical body 430 having a fixed inner sleeve 432 which slidably receives the piston-like member 434. A plunger 435, having valve surfaces thereon, is adapted to control the member 434 and to be axially moved thereby within an extreme end of the body 430.

A low pressure exhaust cavity 438 surrounds one portion of sleeve 432 within the body 430, and communicates with a series of axially spaced "flip jets" 440 in the piston-like member 434 by means of port 442 formed in the sleeve 432. A series of "progressive jets" 431 are provided in sleeve 432 and they communicate, as shown, with cavity 438.

The structural details of the various valve components will become apparent from the following description of the operating sequence over the full range of shifts. For purposes of simplifying the description, it will be assumed that the engine is kept at a constant throttle position and that the speed of the vehicle is progressively increased from the lowest to the highest value. Also, it will be assumed that the transmission remains in forward speed operation.

*First speed operation—refer to Figure 3*

The high pressure governor oil is delivered to one side of piston 434 and moves the same in an axial direction against the balancing force exerted by spring 444, the plunger 435 being moved along with piston 434 by virtue of the abutting contact therebetween. A throttle modulated pressure exists in chamber 446 which serves to supplement the force exerted by spring 444 upon piston 434.

A conduit 448 extends from the chamber 446 through a manual lock-down valve shown at 450, which will subsequently be described more fully. The conduit 448 finally extends to a throttle modulating valve 452 from which it receives a supply of fluid at a modulated pressure determined by the position of the engine throttle linkage shown in part at 454.

The piston 434 moves to the position shown in Figure 3 wherein the flip jet "A" is in communication with the ports 442. The restriction offered by the port 442 to the passage of fluid from the governor valve to the exhaust conduit shown at 456 is such that the piston 434 may be stabilized in one axial position for a given governor pump output pressure which in turn is proportional to engine speed.

A high pressure supply line is shown at 458 which may contain fluid under a pressure of approximately 200 p.s.i. The line 458 may be connected to any suitable pump source.

The high pressure fluid from the supply line 458 is applied directly to the "forward" clutch by means of the conduit 460 which extends to the forward clutch through a transmission clutch relay valve shown at 462 and the selector valve 428.

The clutch relay valve 462 is effective to control the distribution of supply line pressure to either the forward or reverse clutches and it includes a sliding element 464 which is moved by a manually actuated crank 466 against the force of spring 468. When the crank 466 is retracted manually, the valve element blocks the conduit 460 to prevent the forward or reverse clutch from being energized. As the crank 466 is slowly returned toward the position shown, the valve element 464 effects a gradual pressure build-up in the forward or reverse clutch servo to gradually energize the same.

The selector valve 428 is effective to selectively energize either the forward or reverse clutches depending upon the position of a sliding valve element 470. The various positions of element 470 may be fixed by the valve elements 470 shown at 472. When the detent means assumes the central position, supply fluid pressure is blocked from reaching both the reverse and forward clutches and the transimission is then said to be in neutral.

Another conduit, shown at 474, is connected to the supply line 458 through a regulating valve 476. The pressure within conduit 474 is at a reduced pressure, approximately 70 p.s.i., and is represented by means of crossed shading marks while the supply pressure in line 458 is represented by horizontal shading marks.

The conduit 474 extends to the governor valve 410 and is connected to conduit 478 by means of the ports 480 and 482 formed in sleeve 436. The plunger 435 has spaced lands thereon at 484 and 486 which serve to direct the fluid under pressure from port 480 to conduit 478 through an annular space formed between the plunger 435 and sleeve 436.

The conduit 478 extends to the split ratio shift valve shown at 488. The regulated pressure in conduit 474 is permitted to act against one end of a movable element 490 and moves the same axially against the pressure exerted thereon by spring 492.

When the element 490 is in the position shown, communication is established between another conduit shown at 494 and the brake $B_1$ in the split ratio unit and communication is blocked between clutch $C_1$ and conduit 494.

A pressure modulating valve is shown at 496 which is adapted to interconnect the supply conduit 458 and the conduit 494 and to modulate the supply pressure in response to the movement of the throttle linkage portion 454. The modulated pressure, which is shown by means of dotted shading, is applied to the brake $B_1$, as shown, and to the main relay valve shown at 498 through the branch conduit 500.

The main relay valve 498 comprises three separate, abutting, sliding elements, 502, 504, and 506. The element 502 is hollow, and in the position shown in Figure 3 it is effective to establish communication between the brake servo $B_2$ and conduit 500 thereby causing the brake servo $B_2$ to be energized with throttle modulated oil pressure. A spring 508 is effective to bias the elements 502, 504 and 506 in one axial direction.

Since both brake servo $B_1$ and the brake servo $B_2$ are energized, the transmission will operate in the first speed range.

*Second speed operation—refer to Figure 4*

Referring next to Figure 4, the position of the various valve elements there shown is that which exists during second speed operation. Upon an increase in engine speed the governor oil pressure in conduit 408 is increased. Accordingly, the piston 434 may now move axially against the force of spring 444 and the throttle modulated pressure until the port B in the piston 434 is directly over the port 442. The first progressive jet 431 is also uncovered thereby increasing the total exhaust area for the governor pump discharge pressure. This axial movement of the piston 434 is accompanied by a corresponding movement of the land 486 on the plunger 435 which causes the same to block off the conduit 478 from conduit 473 which contains regulated fluid pressure from line 458. Simultaneously, the conduit 474 is opened to the exhaust conduit 456 through the ports 482.

Accordingly, the regulated pressure acting against the plunger 490 in the split ratio shift valve 488 is reduced and the spring 492 is now effective to shift plunger 490 to the right as shown in Figure 4 thereby causing the modulated fluid pressure in conduit 494 to be blocked off from brake servo $B_1$ and to be simultaneously applied to clutch servo $C_1$.

It should be noted that the modulated pressure in conduit 494 and branch conduit 500 is still continuously applied to the brake servo $B_2$ through the main relay valve 498. Thus brake servos $B_1$ and $B_2$ are energized which will result in second speed operation as previously explained.

*Third speed operation—refer to Figure 5*

Upon a further increase in the speed of the governor pump 400 as the vehicle speed increases, the governor pressure in conduit 408 may be sufficient to move the piston 434 axially from the position shown in Figure 4 to that shown in Figure 5 until the port C in piston 434 assumes a position directly over the ports 442, said movement taking place against the opposing force of spring 444 and the opposing force due to the throttle modulated pressure in chamber 446. The second progressive jet 431 is simultaneously uncovered thereby further increasing the governor pressure exhaust area. This movement causes the valve land 486 to move further to the right, as shown in Figure 5 thereby once again permitting regulated pressure to enter conduit 478 through the annular space provided between land 436 and a second land on plunger 475 shown at 512. The regulated pressure in conduit 478 is again effective to act against plunger 490 which, as previously seen, causes the same to shift against the biasing force of spring 492 to permit modulated pressure to energize brake servo $B_1$ while simultaneously exhausting the clutch servo $C_1$.

It will further be noted that the valve land 484 has moved sufficiently to the right, as viewed in Figure 5, to provide fluid communication between conduit 474 and a conduit 514 which extends to one side of slidable valve element 506 in the main relay valve 498. The regulated pressure thus transmitted to the relay valve 498 causes the elements 506, 504, and 502 to shift against the biasing force of spring 508 until the valve element 506 contacts a shoulder 516 in the main relay valve 498. This movement of valve element 502 causes the valve lands 518 and 520, which are formed thereon, to block off the conduit extending from relay valve 498 to brake servo $B_2$ and to simultaneously cause the branch conduit 500 to be in fluid communication, through the axial passageway provided as shown through the center of the element 502, with the fluid conduit which extends to brake servo $B_3$. The brake servo $B_2$ is exhausted through exhaust port 522.

A split ratio exhaust control valve is shown at 524 and it includes a plunger 526 which is actuated by a linkage mechanism shown at 528 and 530. As seen from the drawings, the linkage mechanism 528, 530 is effective to shift the plunger 526 to the right as the valve element 502 moves to the left. The axial position of the plunger 526 is positively determined by a suitable spring-loaded detent means shown at 532.

After the main relay valve has assumed any of the several operative positions, the clutch $C_1$ may be exhausted through the annular space provided between any two adjacent valve lands of a series of such lands provided on plunger 526 and then through the exhaust port 534. In shifting from the position shown in Figure 4 for second speed operation to that shown in Figure 5 for third speed operation, the plunger 526 is moved to the right so that the fluid in clutch servo $C_1$ may exhaust through the annular space provided between the first two of the series of valve lands which are designated by numerals 536 and 538. During the time interval which elapses while valve element 502 and plunger 526 are in motion, the exhaust conduit for clutch servo $C_1$ is blocked off by the valve lands 536 and 538 so that the only means for the escape of the energizing fluid from clutch servo $C_1$ is that which is provided by a restricted orifice shown at 540 in the exhaust conduit. The action of the plunger 526 is thus effective to cause a slight delay after the shift from second speed to third speed is initiated and it insures that the clutch servo $C_1$ will not be fully deenergized before the brake servo $B_3$ is fully energized. This overlapping in the shifting sequence will assure a smooth shift and the associated planetary elements will not be momentarily speeded up or caused to "run-away."

It is also apparent from the drawings that the modulated pressure in conduit 514 is transmitted to the spring chamber for the relay valve 462 during operation in third speed range or in any higher speed range to resist manual declutching of the forward or the reverse clutch.

Thus brake servos $B_1$ and $B_3$ are now energized which results in third speed operation as previously described.

*Fourth speed operation—refer to Figure 6*

Upon a further increase in the speed of the vehicle the governor pressure in conduit 408 may move to a value such that the piston 434 in the governor valve 410 will move axially to bring the fourth flip jet D into fluid communication with the orifice 442 and to uncover the third progressive jet 431. The valve land 512 on plunger 435 is now moved sufficiently far to the right to cause the conduit 478 to be blocked from fluid communication with conduit 474. The conduit 478 is simultaneously exhausted through exhaust conduit 456. Thus, as previously described with reference to second operation, the regulated pressure no longer acts on the end of the plunger 490 in the split ratio shift valve thereby permitting the same to shift in response to the force exerted by spring 492 which causes clutch servo $C_1$ to become energized while simultaneously exhausting brake servo $B_1$.

The positions of the valve elements in the main relay valve 498 remain unchanged. Clutch servo $C_1$ and brake servo $B_3$ are then energized which results in fourth speed operation.

*Fifth speed operation—refer to Figure 7*

As the vehicle speed further increases, the piston element 434 in the governor valve 410 shifts until the port E is in fluid communication with orifice 442 and the fourth progressive jet 431 is uncovered. The valve land 512 will therefore be shifted to the position shown thus again establishing communication between conduits 478 and 474 through the annular space defined by valve land 512 and another adjacent land shown at 542. The split ratio shift valve is thus actuated as before to cause brake servo $B_1$ to become energized and to cause the clutch servo $C_1$ to be exhausted.

Also, the valve land 484 on the plunger 435 will be moved sufficiently far to the right, as shown in Figure 7, to cause fluid communication between conduit 474 and a conduit 544, which extends to the main relay valve 498. The regulated fluid pressure thus transmitted to relay valve 498 causes the valve element 504 to shift against the force exerted by spring 508 until the shoulder 546 in the relay valve is contacted. This movement is accompanied by a corresponding movement of the valve lands 518 and 520 on element 502 thereby blocking off the conduit leading to brake servo $B_3$ and establishing communication with the conduit leading to clutch servo $C_2$.

The shifting motion of valve element 502 is effective to move the plunger 526 of the split ratio exhaust control valve 524. This enables the valve 524 to control the rate at which the clutch servo $C_1$ is exhausted, as previously described.

Thus clutch servo $C_2$ and brake servo $B_1$ are both energized which results in fifth speed operation.

*Sixth speed operation—refer to Figure 8*

A further increase in vehicle speed will cause the valve element 434 to shift until jet F becomes aligned with the orifices 442 and the fifth progressive jet is uncovered. The valve land 542 in plunger 435 will thereupon be shifted to the position shown thus causing the conduit 478 to be blocked from fluid communication with conduit 474. This again causes the split ratio shift valve to move to the right hand position thus causing clutch servo $C_1$ and brake servo $B_1$ to be energized and exhausted, respectively, as previously described. The valve elements in the main relay valve 498 remain in the same relative position thus causing the clutch servo $C_2$ to remain energized.

Since clutch servos $C_1$ and $C_2$ are now engaged, the transmission is operating in sixth speed.

*Seventh speed operation—refer to Figure 9*

The position of the governor valve for seventh speed operation is such that the jet G is in fluid communication with the orifices 442 and the sixth progressive jet 431 is uncovered. The corresponding movement of the plunger 435 is such that the valve lands 542 and an adjacent valve land 548 will provide for fluid communication between conduits 478 and 474 thereby causing the plunger 490 of the split ratio shift valve 488 to shift against the force of spring 492 thus causing the brake servo $B_1$ to be again energized. Also, the movement of plunger 435 causes the valve land 484 to establish fluid communication between conduit 474 and a conduit 550, which extends to one side of valve element 502 in the main relay valve 498. The regulated pressure thus transmitted to the main relay valve 498 causes the valve element 502 to shift until it contacts shoulder 552. This movement causes the valve lands 518 and 520 to exhaust the clutch servo $C_2$ and to establish communication between the conduit leading to brake servo $B_4$ and the branch conduit 500.

The movement of valve element 502 also causes a corresponding movement of the plunger 526 in the split power exhaust control valve 524, which, as previously explained, retards the rate at which clutch servo $C_1$ is exhausted.

Brake servos $B_1$ and $B_4$ are now energized which results in seventh speed operation.

Figure 10:
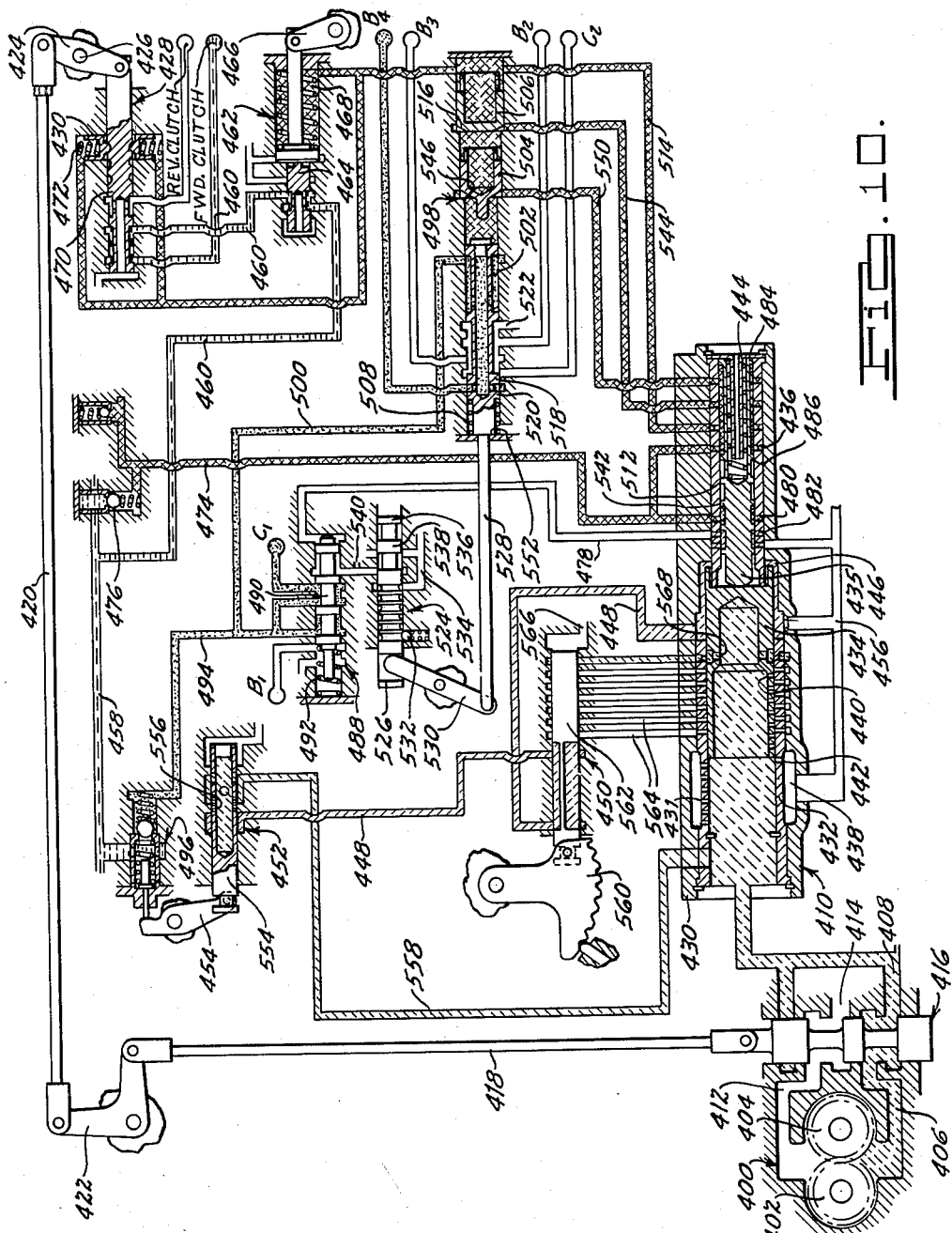

*Eighth speed operation—refer to Figure 10*

The piston 434 of the governor control valve 410 moves completely to the right of orifice 442 when the vehicle speed and the related governor pressure reach a sufficiently high value, thus causing valve land 548 on plunger 435 to block off the conduit 478 from conduit 474. This again causes the split ratio shift valve to move thereby energizing clutch servo $C_1$ and exhausting brake servo $B_1$. The valve elements in the main relay valve 498 do not change position.

Thus clutch servo $C_1$ and brake servo $B_4$ are thereby energized which results in eighth speed operation.

During the above description of the operating sequence, it had been assumed that the engine throttle position remained at a constant setting. However, when the throttle position is changed, the throttle linkage portion 454 is effective to axially shift a plunger 554 in the throttle modulating valve 452. The plunger 554 is provided with a series of axially spaced metering orifices 556 through which the conduit 448 communicates with another conduit 558 which supplies the modulating valve 452 with governor oil. The number of orifices 556 which may function to transfer fluid from conduit 558 to conduit 448 will vary depending upon the axial position of plunger 554. The value of the modulated pressure in conduit 448 is therefore variable and is dependent upon the engine throttle position. It is thus seen that the shifting sequence of the transmission is responsive to both speed and engine throttle setting.

A manual lock-down valve is shown at 450 and it comprises a manually actuated lever 560 which is connected to a slidable plunger 562. A series of passages 564 is adapted to be selectively blocked by the plunger 562 as the same moves from the position shown in Figure 3 to the left. Upon movement to the left, the passages 564 are progressively opened to the exhaust port 566. A series of openings 568 is provided in the portion 434 of the governor valve 410, as shown. A desired number of passages 564 may be opened to obtain a lockdown at the desired reduction ratio. The piston 434 will be unable, except at an increased engine speed, to move beyond the axial position at which the interior of the governor valve 410 communicates with one of the opened passages 564 through the associated opening 568. The engine speed at which an upshift will occur, while operating at a selected range, will thus be higher than that normally required during full throttle operation.

Referring again to the assembly view of Figure 1, it will be noted that each of the brake and clutch servos is actuated by means of fluid pressure which is adapted to act on one side of the associated movable piston elements. Suitable conduit means are provided for admitting the actuating fluid to the fluid working chamber of the respective servos as previously described. However, the clutch servos are unique in that each of them is further provided with a second fluid chamber on the side of the associated friction element which is oppositely disposed with respect to the fluid working chambers. This second fluid chamber is adapted to receive lubricating fluid under lubricating oil supply pressure.

It will be noted that the various clutch servos are adapted to rotate with the associated planetary elements after being energized. The fluid pressure which would normally be produced in the respective fluid working chambers of the clutch servos due to the centrifugal pressure which accompanies this rotation tends to exert a holding force on the clutch friction elements and to keep the clutch servo energized even after the exhaust port for the associated control valve has been opened.

The function of the respective second fluid chambers in the clutch servos is to provide a means for counteracting the centrifugal pressure build-up in the fluid working chambers with an oppositely directed pressure force. The response of the clutch servos to the movement of the associated control valve elements will therefore be positive and immediate.

This fluid balancing feature may be more particularly pointed out with reference to Figure 1 of the drawings. It may be noted, for example, that the clutch member 108 of the reverse clutch is provided with a lubricating oil passage 580 which extends radially into an annular chamber 582 defined by the piston member 118 and an end plate 584 which may be held on the hub of the clutch member 108 by means of a snap ring or the like. As the speed of the rotating clutch member 108 increases there is a corresponding pressure build-up on both sides of the piston member 118 in the working chamber defined by recess 116 and in the chamber 582 which tend to oppose and to substantially balance each other. The spring 134 may then cause the clutch friction elements 104 and 105 to become disengaged immediately upon exhausting the servo fluid working chamber.

Similar fluid balancing chambers may be provided for the forward clutch at 586, for the clutch 1 in the split power unit 12 at 588 and for the clutch 2 at 590.

Although a certain preferred embodiment of the invention has been specifically disclosed, it is understood that the invention is not limited thereto since many variations will be readily apparent to those skilled in the art and the invention is to be given its broadest possible interpretation within the terms of the following claims.

We claim:

1. In a power transmission, a power output shaft, a planetary gear unit comprising a ring gear member, planet gears and a sun gear member mutually interengaged and coaxially disposed about an axis transverse to the axis of said output shaft, a first carrier member for carrying said planet gears, one member of said planetary gear unit being adapted to be driven by a source of input power and another member thereof being adapted to be braked, a plurality of compounded planetary units having the component elements thereof coaxially disposed about said output shaft, said compounded planetary units each comprising a sun gear member and a ring gear member with planet gears engaged therebetween each compounded planetary unit having a carrier member for carrying the planet gears thereof, a first pair of said compounded planetary units having the sun gear members thereof connected to a common shaft means, a second pair of said compounded planetary units having the sun gear members thereof connected to said power output shaft, drive means interconnecting a portion of said first named planetary gear unit with said shaft means and with a member of one unit of said second pair of said compounded planetary units, one member of each unit of said second pair of units being connected together and one member of each unit of said first pair of units being connected together, the carrier member of one unit of said first pair of compounded planetary units being drivably connected to said output shaft, means for selectively clutching together and braking other members of said compounded planetary units in sequence to progressively obtain varying torque multiplication ratios between a power input source and said output shaft.

2. In a power transmission, a power output shaft, a planetary gear unit comprising a ring gear member, a sun gear member with planet gears interengaged therebetween and a carrier member for carrying said planet gears, said unit being coaxially disposed about an axis transverse to the axis of said output shaft, one member of said planetary gear unit being adapted to be driven by a source of input power and another member thereof being adapted to be braked, a plurality of compounded planetary units having the component elements thereof coaxially disposed about said output shaft and axially spaced thereon, said compounded planetary units each comprising a sun gear member, a ring gear member, planet gears engaged therebetween, and a carrier member for carrying said last-named planet gears, a first adjacent pair of said axially spaced planetary units having the sun gear members thereof connected to a common shaft means a second pair of said compounded planetary units having the sun gear members thereof connected to said power output shaft, drive means interconnecting said first named planetary gear unit with said shaft means and with a member of one unit of said second pair of compounded planetary units, one member of each unit of said second pair of units being connected together and one member of each unit of said first pair of units being connected together, the carrier member of one of said first adjacent pair of compounded planetary units being drivably connected to said output shaft, means for selectively clutching together members of one unit of said second pair of axially spaced planetary units and brake means for selectively braking one member of each unit of said first pair of planetary units and for braking one member of said second pair of planetary units.

3. In a power transmission, a power output shaft, a planetary gear unit comprising a ring gear member, a sun gear member with planet gears interengaged therebetween and a carrier member for carrying said planet gears, said unit being coaxially disposed about an axis transverse to the axis of said output shaft, one member of said planetary gear unit being adapted to be driven by a source of input power and another member thereof being adapted to be braked, a plurality of compounded planetary units having the component elements thereof coaxially disposed about said output shaft and axially spaced thereon, said compounded planetary units each comprising a sun gear member and a ring gear member with planet gears engaged therebetween, a carrier member for carrying said last-named planet gears, a first adjacent pair of said axially spaced planetary units having the sun gear members thereof connected to a common shaft means, one member of each unit of said first pair of planetary units being interconnected drive means interconnecting said first named planetary gear unit with said shaft means and with a carrier member of one unit of said second pair of compounded planetary units, the ring gear of said one unit being connected to the carrier member of the other unit of said second pair of compounded planetary units, the carrier member of one of said first adjacent pair of compounded planetary units being drivably connected to said output shaft, means for selectively clutching together members of one unit of said second pair of axially spaced planetary units, the sun gear members of said other pair of axially spaced planetary units being connected to a common portion of said output shaft and brake means for selectively braking one member of each unit of said first pair of units and for braking one member of said second pair of units.

4. In a power transmission, a power output shaft, a planetary gear with planet gears unit comprising a ring gear member, a sun gear member with planet gears interengaged therebetween and a carrier member for carrying said planet gears, said unit being coaxially disposed about an axis transverse to the axis of said output shaft, one member of said planetary gear unit being adapted to be driven by a source of input power and another member thereof being adapted to be braked, a plurality of compounded planetary units having the component elements thereof coaxially disposed about said output shaft and axially spaced thereon, said compounded planetary units each comprising a sun gear member and a ring gear member with planet gears engaged therebetween, a carrier member for carrying said last-named planet gears, a first adjacent pair of said axially spaced planetary units having the sun gear members thereof connected to a common shaft means, drive means interconnecting said first named planetary gear unit with said shaft means, the carrier member of one of said first adjacent pair of compounded planetary units being drivably connected to said output shaft, the ring gear member of said one unit of said first pair of units being connected to the carrier member of the other unit thereof the sun gear members of the other pair of axially spaced planetary units being connected to a common portion of said output shaft, the carrier member of one unit of said other pair of axially spaced planetary units being drivably connected to said shaft means the ring gear of said one unit of said other adjacent pair of axially spaced planetary units being connected to the carrier member of the other unit thereof, and means for selectively clutching together and for braking other members of said compounded planetary units in sequence to obtain a series of torque ratios.

5. A power transmitting mechanism comprising in combination, a transmission housing, a simple planetary unit rotatably mounted in one portion of said housing, said simple planetary unit including a ring gear and a sun gear with planet gears engaged therebetween, a carrier member for carrying said planet gears, a power output shaft rotatably mounted in another portion of said housing, a sleeve rotatably journalled about said output shaft, two pairs of compounded planetary units rotatably mounted about said output shaft each at axially spaced relative positions, said compounded planetary units each comprising a sun gear member and a ring gear member with interengaged planet gears, a carrier member for carrying said last-named planet gears, the sun gear members of one of said pairs of units and the carrier member of one unit of the other pair of units being commonly secured to said sleeve, the sun gear members of said other pair of units being commonly connected to said output shaft, the carrier member of one unit of said one pair of units being connected to said output shaft, the ring gear member of said one unit of said one pair of units being connected to the carrier of the other unit thereof, means for selectively clutching together members of one unit of said other pair of units and for braking one member thereof to said housing, a right angle drive means drivably connecting the carrier member of said simple planetary unit to said sleeve and means for selectively braking the other members of said one pair of planetary units, the other members of said other pair of planetary units being connected to each other.

6. A power transmitting mechanism as set forth in claim 5 wherein said right angle drive means includes a first gear drivably connected to the carrier member of said simple planetary unit, a second gear rotatably journalled in a portion of said housing about said output shaft and engaged with said first gear, and means for selectively clutching said second gear to said sleeve.

7. A power transmitting mechanism as set forth in claim 6 wherein said right angle drive means further includes a third gear coaxially mounted about said output shaft in juxtaposition with respect to said second gear and interengaged with said first gear, and means for selectively clutching said third gear to said sleeve.

8. A power transmitting mechanism comprising a transmission housing, a simple planetary unit rotatably mounted in one portion of said housing, said simple planetary unit including a ring gear and a sun gear with interconnecting planet gears, a carrier member drivably connected to said planet gears, a power output shaft rotatably mounted in another portion of said housing, a sleeve rotatably journalled about said output shaft, two pairs of compounded planetary units rotatably mounted about said output shaft each at axially spaced relative positions, said compounded planetary units each comprising a sun gear and a ring gear with interconnecting planet gears a carrier assembly drivably carrying said last-named planet gears, the sun gear of one of said pairs of units being commonly connected to said sleeve, the sun gears of the other of said pair of units being commonly connected to said output shaft, the carrier assembly of one unit of said one pair of units being fixed to said output shaft, the carrier assembly of one unit of said other pair of units being fixed to said sleeve, the ring gear of said one unit of said one pair of units being drivably connected to the carrier assembly of the other unit of said one pair of units, the ring gear of said one unit of said other pair of units being drivably connected to the carrier assembly of the other unit of said other pair of units, means for selectively clutching the ring gear of the other unit of said other pair of units to said output shaft and for braking the same to said housing, a right angle drive means interconnecting the carrier assembly of said simple planetary unit to said sleeve, said right angle drive means including a first gear drivably secured to the carrier assembly of said simple planetary unit, a second gear rotatably journalled in said other portion of said housing about said output shaft and interengaged with said first gear, means for selectively clutching said second gear to said sleeve, and means for selectively braking each of the ring gears of the said one pair of units to said housing.

9. A power transmitting mechanism comprising a transmission housing, a simple planetary unit rotatably mounted in one portion of said housing, said simple planetary unit including a ring gear and a sun gear with interconnecting planet gears, a carrier member drivably connected to said planet gears, a power output shaft rotatably mounted in another portion of said housing, a sleeve rotatably journalled about said output shaft, two pairs of compounded planetary units rotatably mounted about said output shaft each at axially spaced relative positions, said compounded planetary units each comprising a sun gear and a ring gear with interconnecting planet gears a carrier assembly drivably carrying said last-named planet gears, the sun gear of one of said pairs of units being commonly connected to said sleeve, the sun gears of the other of said pairs of units being commonly connected to said output shaft, the carrier assembly of one unit of said one pair of units being fixed to said output shaft, the carrier assembly of one unit of said other pair of units being fixed to said sleeve, the ring gear of said one unit of said one pair of units being drivably connected to the carrier assembly of the other unit of said one pair of units, the ring gear of said one unit of said other pair of units being drivably connected to the carrier assembly of the other unit of said other pair of units, means for selectively clutching the ring gear of one of said other pair of units to said output shaft and for braking the same to said housing, a right angle drive means interconnecting the carrier assembly of said simple planetary unit to said sleeve, said right angle drive means including a first gear drivably secured to the carrier member of said simple planetary unit, a second gear rotatably journalled in said other portion of said housing about said output shaft and interengaged with said first gear, means for selectively clutching said second gear to said sleeve, means for selectively braking each of the ring gears of the said one pair of units to said housing, a power input member drivably connected to the ring gear of said simple planetary unit, and means for selectively clutching and braking the sun gear of said simple planetary unit to the carrier member for the same and to the housing respectively, said clutching and braking means for said compounded planetary units being adapted to be energized in an operative sequence while said means for clutching said second gear to said sleeve remains energized thereby providing a substantially uniform progressive series of torque multiplication gear ratios between said power input source and said output shaft.

10. A power transmitting mechanism as set forth in claim 9 wherein said clutching and braking means for said simple planetary unit are adapted to be alternately energized in sequence during the operation of each individual clutch and brake means for the pairs of compounded planetary units thereby sequentially compounding the torque reduction ratios of said simple planetary unit with each of the plurality of reduction ratios of said compounded planetary units.

11. A power transmitting mechanism as set forth in claim 10 wherein said right angle drive means further includes a third gear rotatably journalled in said other portion of said housing about said output shaft in juxtaposition with respect to said second gear, and means for selectively clutching said third gear to the carrier member of said one unit of said other pair of units alternately with respect to the operation of said means for clutching said second gear to said sleeve.

12. A power transmitting mechanism as set forth in claim 8 wherein said right angle drive further includes a third gear rotatably journalled in said other portion of said housing about said output shaft in juxtaposition with respect to said second gear, and means for selectively clutching said third gear to the carrier member of said one unit of said other pair of units alternately with respect to the operation of said means for clutching said second gear to said sleeve.

13. In a power transmitting mechanism, a housing; two pairs of compounded planetary units mounted within said housing, each unit of said pairs of units comprising a ring gear member, a sun gear member, a carrier member and planet gears carried by said carrier member and interengaged with said sun and ring gear member; a power output shaft, a sleeve coaxially mounted about said shaft, each of said units being coaxially disposed with respect to each other about said output shaft, the sun gear members of one of said pairs of units being connected to said sleeve, the sun gear members of the other of said pairs of units being connected to said output shaft, means for selectively clutching together members of one unit of said other pair of units and for braking one member thereof to said housing, the carrier member of one unit of said one pair of units being connected to said output shaft, the ring gear member of said last-named unit being coupled to the carrier member of the other unit of said one pair of units, means for delivering driving power to said sleeve and to the carrier member of the other unit of said other pair of units, the ring gear member of said other unit of said other pair of units being connected to the carrier member of said one unit of said other pairs of units, and means for selectively braking the ring gear members of said one pair of units to said housing.

14. A transmission as set forth in claim 13 wherein said means for delivering driving power includes an input shaft, a right angle drive between said input and output shafts, and a simple planetary gear unit operatively connecting said input shaft to a power source.

15. In a power transmitting mechanism, a housing; two pairs of compounded planetary units mounted within said housing, each unit of said pairs of units having components comprising a ring gear, a sun gear, a carrier and planet gears carried by said carrier and interengaged with said sun and ring gears; a power output shaft, a sleeve coaxially mounted with respect to said shaft, each of said units being coaxially disposed with respect to said output shaft, the sun gears of one of said pairs of units being fixed to said sleeve, the sun gears of the other of said pairs of units being fixed to said output shaft, means for selectively clutching together components of said other pair of units and for braking one component of the same to said housing, the carrier of one unit of said one pair of units being connected to said output shaft, the ring gear of said last-named unit being coupled to the carrier of the other unit of said one pair of units, the ring gear of one unit of said other pair of units being connected to the carrier of the other unit of said other pair of units, means for delivering driving power to said sleeve and to the carrier of said one unit of said other pair of units, and means for selectively braking each of the ring gears of said one pair of units to said housing.

16. In a power transmitting mechanism, a housing; two pairs of compounded planetary units mounted within said housing, each unit of said pairs having components comprising a ring gear, a sun gear, a carrier and planet gears carried by said carrier and interengaged with said sun and ring gears; a power output shaft, a sleeve axially mounted with respect to said shaft, each of said units being axially disposed with respect to said output shaft, the sun gears of one of said pairs of units being fixed to said sleeve, the sun gears of the other of said pairs of units being fixed to said output shaft, means for selectively clutching together components of said other pair of units and for braking one component of the same to said housing, the carrier of one unit of said one pair of units being connected to said output shaft, the ring gear of said last-named unit being coupled to the carrier of the other unit of said one pair of units, the ring gear of one unit of said other pair of units being connected to the carrier of the other unit of said other pair of units, means for delivering driving power to said sleeve, the carrier of said one unit of said other pair of units being connected to said sleeve, and means for selectively braking each of the ring gears of said one pair of units to said housing.

17. In a power transmitting mechanism, a housing; two pairs of compounded planetary units mounted within said housing, each unit of said pairs of units having components comprising a ring gear, a sun gear, a carrier and planet gears carried by said carrier and interengaged with said sun and ring gears; a power output shaft, a sleeve coaxially mounted with respect to said shaft, each of said units being coaxially disposed with respect to said output shaft, the sun gears of one of said pairs of units being connected to said sleeve, the sun gears of the other of said pairs of units being connected to said output shaft, means for selectively clutching together components of one unit of said other pair of units and for braking one component of the same to said housing, the carrier of one unit of said one pair of units being connected to said output shaft, the ring gear of said last-named unit being coupled to the carrier of the other unit of said one pair of units, means for delivering driving power to said sleeve and to the carrier of the other unit of said other pair of units, the ring gear of said other unit of said other pair of units being connected to the carrier of said one unit of said other pair of units, means for selectively braking the ring gears of said one pair of units to said housing, said power delivery means comprising a power input shaft having an axis substantially perpendicular to the axis of said output shaft, and a right angle drive means for drivably connecting said input shaft and said sleeve.

18. In a power transmitting mechanism, a housing; two pairs of compounded planetary units mounted within said housing, each unit of said pairs of units comprising a ring gear, a sun gear, a carrier and planet gears carried by said carrier and interengaged with said sun and ring gears; a power output shaft, a sleeve concentrically mounted about said shaft, each of said units being coaxially disposed with respect to each other about said output shaft, the sun gears of one of said pairs of units being fixed to said sleeve, the sun gears of the other of said pairs of units being fixed to said output shaft, means for selectively clutching the ring gear of one unit of said other pair of units to the sun gear thereof and for braking the same to said housing, the carrier of one unit of said one pair of units being fixed to said output shaft, the ring gear of said last-named unit being coupled to the carrier of the other unit of said one pair of units, the ring gear of the other unit of said other pair of units being connected to the carrier of said one unit of said other pair of units, means for delivering driving power to said sleeve, the carrier of said one unit of said other pair of units being connected to said sleeve, means for selectively braking each of the ring gears of said one pair of units to said housing, said power delivery means comprising a power input shaft having an axis substantially perpendicular to the axis of said output shaft, and a right angle drive means for drivably connecting said input shaft and said sleeve.

19. In a power transmitting mechanism, a housing; two pairs of compounded planetary units mounted within said housing, each unit of said pairs of units comprising a ring gear, a sun gear, a carrier and planet gears carried by said carrier and interengaged with said sun and ring gears; a power output shaft, a sleeve concentrically mounted about said shaft, each of said units being coaxially disposed with respect to each other about said output shaft, the sun gears of one of said pairs of units being fixed to said sleeve, the sun gears of the other of said pairs of units being fixed to said output shaft, means for selectively clutching the ring gear of one unit of said other pair of units to the sun gear thereof and for braking the same to said housing, the carrier of one unit of said one pair of units being fixed to said output shaft, the ring gear of said last-named unit being coupled to the carrier of the other unit of said one pair of units, the ring gear of the other unit of said other pair of units being connected to the carrier of said one unit of said other pair of units, means for delivering driving power to said sleeve, the carrier of said one unit of said other pair of units being connected to said sleeve, means for selectively braking each of the ring gears of said one pair of units to said housing, said power delivery means comprising a power input shaft having an axis substantially perpendicular to the axis of said output shaft, a right angle drive means for drivably connecting said input shaft and said sleeve, and a simple planetary gear unit having portions drivably connected to said input shaft, said simple planetary gear unit being adapted to be powered by a power source.

20. In a multiple speed transmission, a power output shaft, a sleeve shaft coaxially disposed with respect to said output shaft, four planetary gear units coaxially mounted about the axis of said output shaft at axially spaced locations, each planetary having components comprising a sun gear, a ring gear, a carrier and planet gears carried by said carrier, said planet gears interengaging said sun and ring gears, the sun gears for a first and a second of said units being connected to said sleeve shaft, the carrier for said first unit being connected to said output shaft the sun gear for a third and the sun gear for a fourth of said units each being connected to said output shaft, the ring gear of said first unit being connected to the carrier of said second unit, the carrier for said third unit being connected to said sleeve shaft, clutch means for selectively clutching together components of said fourth unit, the ring gear of said third unit being connected to the carrier for said fourth unit, power input means for powering said sleeve shaft and means for selectively braking the ring gears for said first, second and fourth units.

21. In a multiple speed transmission, a power output shaft, a sleeve shaft coaxially disposed with respect to said output shaft, four planetary gear units coaxially mounted about the axis of said output shaft at axially spaced locations, each planetary unit having components comprising a sun gear, a ring gear, a carrier and planet gears carried by said carrier, said planet gears interengaging said sun and ring gears, the sun gears for a first and a second of said units being connected to said sleeve shaft, the carrier for said first unit being connected to said output shaft the sun gear for a third and a fourth of said units being connected to said output shaft, the ring gear of said first unit being connected to the carrier of said second unit, the carrier for said third unit being connected to said sleeve shaft, clutch means for selectively clutching together components of said fourth unit, the ring gear of said third unit being connected to the carrier for said fourth unit, power input means for powering said sleeve shaft including a driving shaft, means for selectively braking the ring gears for said first, second and fourth units, a driving gear positively connected to said driving shaft, and a main clutch means for selectively clutching said driving gear to said sleeve shaft.

22. In a multiple speed transmission, a power output shaft, a sleeve shaft coaxially disposed with respect to said output shaft, four planetary gear units coaxially mounted about the axis of said output shaft at axially spaced locations, each planetary unit having components comprising a sun gear, a ring gear, a carrier and planet gears carried by said carrier, said planet gears interengaging said sun and ring gears, the sun gears for a first and a second of said units being connected to said sleeve shaft, the sun gear for a third and a fourth of said units being connected to said output shaft, the ring gear of said first unit being connected to the carrier of said second unit, the carrier for said third unit being connected to said sleeve shaft, the carrier for said first unit being connected to said output shaft clutch means for selectively clutching together components of said fourth unit, the ring gear of said third unit being connected to the carrier for said fourth unit, means for selectively braking the ring gears for said first, second and fourth units, and power input means for powering said sleeve shaft, including a driving shaft and two geared power flow paths between said driving shaft and said sleeve shaft, each path including a main clutch means for selectively transmitting power therethrough to said sleeve shaft, said sleeve shaft being driven in one direction as one of said main clutch means becomes energized and in the opposite direction as the other main clutch means becomes energized.

23. The combination as set forth in claim 22 wherein each of said power flow paths includes a right angle geared drive between said driving shaft and said sleeve shaft.

24. In a multiple speed transmission, a power output shaft, a sleeve shaft coaxially disposed with respect to said output shaft, four planetary gear units coaxially mounted about the axis of said output shaft at axially spaced locations, each planetary unit having components comprising a sun gear, a ring gear, a carrier and planet gears carried by said carrier, said planet gears interengaging said sun and ring gears, the sun gears for a first and a second of said units being connected to said sleeve shaft, the sun gear for a third and a fourth of said units being connected to said output shaft, the ring gear of said first unit being connected to the carrier of said second unit, the carrier for said third unit being connected to said sleeve shaft, the carrier for said first unit being connected to said output shaft means for selectively clutching components of said fourth unit and for braking one component of the same to said housing, the ring gear of said third unit being connected to the carrier for said fourth unit, means for selectively braking the ring gears for said first and second units to said housing, and power input means for powering said sleeve shaft.

25. In a multiple speed transmission, a power output shaft, a sleeve shaft coaxially disposed with respect to said output shaft, four planetary gear units coaxially mounted about the axis of said output shaft at axially spaced locations, each planetary unit having components comprising a sun gear, a ring gear, a carrier and planet gears carried by said carrier, said planet gears interengaging said sun and ring gears, the sun gears for a first and a second of said units being connected to said sleeve shaft, the sun gear for a third and a fourth of said units being connected to said output shaft, the ring gear of said first unit being connected to the carrier of said second unit, the carrier of said first unit being connected to said output shaft the carrier for said third unit being connected to said sleeve shaft, means for selectively clutching together components of said fourth unit and for braking one component of the same to said housing, the ring gear of said third unit being connected to the carrier for said fourth unit, means for selectively braking the ring gears for said first and second units to said housing, power input means for powering said sleeve shaft, said power input means including a driving shaft drivably connected to said sleeve shaft, and a simple planetary gear unit having a portion thereof connected to said driving shaft and another portion thereof adatped to be connected to a power source, means for selectively braking a portion of said simple planetary unit to said housing and for clutching separate portions thereof together to provide two speed ratios, said two speed ratios being alternately compounded with each ratio obtained by said coaxially mounted gear units.

26. The combination as set forth in claim 25 wherein said simple planetary gear unit includes a sun gear, a ring gear, a carrier and planet gears carried by said carrier and interengaged with said last-named sun and ring gears, the ring gear for said simple planetary unit being powered by said power source, means for selectively braking the sun gear for said simple planetary unit to said housing and for selectively and alternately clutching the sun gear and carrier for said simple planetary unit together.

27. In a multiple speed power transmission mechanism for delivering torque from a driving member to a driven member, four planetary gear units, each unit comprising a sun gear member, a ring gear member, planet gears in engagement with said sun gear member and said ring gear member and a carrier member for rotatably carrying said planet gears, a first member of a first of said units and a first member of a second of said units being connected to a common portion of said mechanism for conjoint rotation, a first member of a third of said units and a first member of a fourth of said units being connected to said driven member, a second member of said first unit being connected to said driven member, means for drivably connecting said driving member to said common portion and to a second member of said third unit, means for connecting a second member of said fourth unit to a third member of said third unit and means for connecting a second member of said second unit to a third member of said first unit, and clutch and brake means for selectively clutching members of said gear units together and for braking members of said gear units to provide a plurality of torque delivery paths between said driving and driven members.

28. In a multiple speed power transmission mechanism for delivering torque from a driving member to a driven member, four planetary gear units, each unit comprising a sun gear member, a ring gear member, planet gears in engagement with said sun gear member and said ring gear member and a carrier member for rotatably carrying said planet gears, a first member of a first of said units and a first member of a second of said units being connected to a common portion of said mechanism for conjoint rotation, a first member of a third of said units and a first member of a fourth of said units being connected to said driven member, a second member of said first unit being connected to said driven member, means for drivably connecting said driving member to said common portion and to a second member of said third unit, a second member of said fourth unit being connected to a third member of said third unit, a second member of said second unit being connected to a third member of said first unit, clutch means for selectively clutching together two members of said fourth unit and brake means for selectively braking the third members of said first, second and fourth units.

29. In a multiple speed power transmission mechanism for delivering torque from a driving member to a driven member, four planetary gear units, each unit comprising a sun gear member, a ring gear member, planet gears in engagement with said sun gear member and said ring gear member and a carrier member for rotatably carrying said planet gears, a first member of a first of said units and a first member of a second of said units being connected to a common portion of said mechanism for conjoint rotation, a first member of a third of said units and a first member of a fourth of said units being connected to said driven member, a second member of said first unit being connected to said driven member, drive means for drivably connecting said driving member to said common portion and to a second member of said third unit, means for connecting a second member of said fourth unit to a third member of said third unit, means for connecting a second member of said second unit to a third member of said first unit, and clutch and brake means for selectively clutching members of said gear units together and for braking members of said gear units to provide a plurality of torque delivery paths between said driving and driven members, said drive means comprising dual torque delivery paths, each path being defined in part by a separate driving gear and a separate selectively engagable clutch, said torque delivery paths including power delivery means for driving said separate gears in opposite directions, said mechanism thereby being characterized by a range of forward driving speeds and a full range of reverse driving speeds.

30. In a power transmission mechanism, a housing, a driving member, a driven member, a pair of compounded planetary gear units and a simple planetary, split ratio gear unit, each of said gear units including a ring gear member, a sun gear member, planet gears inter-engaged with said sun and ring gear members and a carrier member rotatably carrying said planet gears, the sun gear members of said compounded gear units being connected to a common shaft and adapted for rotation in unison, means for drivably connecting the carrier member for said split ratio unit to said common shaft, the ring gear member of said split ratio unit being drivably connected to said driving member, the carrier member for one of said compounded gear units being connected to said driven member, the carrier member of the other of said compounded gear units being connected to the ring gear member for said one compounded gear unit, separate brake means for selectively braking the ring gear members for each of said compounded gear units to obtain either of two gear ratios, clutch and brake means for selectively and alternately braking the sun gear member of said split ratio unit and for locking together the members of said split ratio unit in sequence with the selective braking of the ring gear members of the compounded gear units, the brake means for said compounded gear units comprising a separate brake disc connected to the ring gear member of each compounded gear unit to facilitate braking of the same, the brake means for the said split ratio unit comprising a brake disc connected to the sun gear member of the split ratio unit to facilitate braking of the same, a friction member carried by said housing adjacent each brake disc, means for controlling the distribution of fluid pressure to said clutch and brake means for said split ratio unit and to the brake means for said compounded gear units in timed relationship whereby the aforesaid clutch and brake operating sequence is accomplished, and separate fluid pressure operated servos adapted to energize the brake means for each of said gear units, said servos being in fluid communication with said controlling means, each servo including two cooperating, relatively movable, servo portions defining an annular fluid pressure chamber, one servo portion being connected to said housing and the other servo portion being movable toward the associated brake disc when said chamber is pressurized, said split ratio gear unit and said compounded gear units being effective to produce a plurality of powder flow paths between said driving member and said driven member, said power flow paths being characterized by substantially evenly stepped speed ratios, the number of said ratios being equal to twice the number of ratios obtainable by means of said compounded gear units acting alone.

References Cited in the file of this patent

UNITED STATES PATENTS

| | | |
|---|---|---|
| 593,652 | Hardington | Nov. 16, 1897 |
| 1,149,408 | Royce | Aug. 10, 1915 |
| 1,404,253 | Williams | Jan. 24, 1922 |
| 1,545,360 | Small et al. | July 7, 1925 |
| 2,164,729 | Wilson | July 4, 1939 |
| 2,314,664 | Shenstone | Mar. 23, 1943 |
| 2,433,052 | Kelley | Dec. 23, 1947 |